(12) United States Patent
Yumbe et al.

(10) Patent No.: US 9,443,159 B2
(45) Date of Patent: Sep. 13, 2016

(54) TARGET IDENTIFICATION SYSTEM TARGET IDENTIFICATION SERVER AND TARGET IDENTIFICATION TERMINAL

(71) Applicant: HITACHI, LTD., Tokyo (JP)

(72) Inventors: Yoshiki Yumbe, Kokubunji (JP); Takashi Hasegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 697 days.

(21) Appl. No.: 13/762,491

(22) Filed: Feb. 8, 2013

(65) Prior Publication Data

US 2013/0272569 A1 Oct. 17, 2013

(30) Foreign Application Priority Data

Apr. 17, 2012 (JP) ................. 2012-094008

(51) Int. Cl.
  *G06K 9/00* (2006.01)
  *G06K 9/32* (2006.01)
(52) U.S. Cl.
  CPC ........... *G06K 9/3241* (2013.01); *G06K 9/0063* (2013.01); *G06K 9/00771* (2013.01)
(58) Field of Classification Search
  None
  See application file for complete search history.

(56) References Cited

U.S. PATENT DOCUMENTS

| | | | | | |
|---|---|---|---|---|---|
| 5,557,397 | A * | 9/1996 | Hyde | ...................... | G01C 11/02 356/2 |
| 7,184,072 | B1 * | 2/2007 | Loewen | ................. | G01C 11/02 348/140 |
| 7,408,665 | B2 * | 8/2008 | Watanabe | .......... | H04N 1/00132 348/207.1 |
| 7,801,537 | B2 * | 9/2010 | Matsumoto | ....... | H04M 3/42382 455/412.1 |
| 8,416,309 | B2 * | 4/2013 | Yoshimaru | ........ | G06F 17/30247 348/211.99 |
| 8,654,235 | B2 * | 2/2014 | Im | ..................... | H04M 1/72572 345/632 |
| 2003/0069893 | A1 * | 4/2003 | Kanai | ............... | G06F 17/30041 |
| 2006/0195858 | A1 * | 8/2006 | Takahashi | .......... | G01C 21/3602 725/19 |
| 2009/0096875 | A1 * | 4/2009 | Yoshimaru | ........ | G06F 17/30247 348/207.1 |
| 2011/0043620 | A1 * | 2/2011 | Svanholm | ................ | G01C 1/04 348/135 |
| 2012/0033070 | A1 * | 2/2012 | Yamazaki | .......... | G06K 9/00624 348/135 |
| 2013/0018881 | A1 * | 1/2013 | Bhatt | ................ | G06F 17/30241 707/736 |
| 2013/0095855 | A1 * | 4/2013 | Bort | ....................... | G06T 17/05 455/456.2 |

FOREIGN PATENT DOCUMENTS

| | | | |
|---|---|---|---|
| JP | 2001-169164 A | | 6/2001 |
| JP | 2008-244660 A | | 10/2008 |
| JP | 2008244660 A | * | 10/2008 |

* cited by examiner

*Primary Examiner* — Jayesh A Patel
(74) *Attorney, Agent, or Firm* — Mattingly & Malur, PC

(57) ABSTRACT

A computer and a terminal apparatus retain position information about targets. The terminal apparatus includes: a capturing portion that captures an image of the target; a position information acquisition portion that acquires information about a position to capture the target; an orientation information acquisition portion that acquires information about an orientation to capture the target; and a communication portion that transmits the image, the position information, and the orientation information to the computer. The computer identifies at least one first target candidate as a candidate for the captured target from the targets based on the position information about the targets, the acquired position information, and the acquired orientation information. The computer identifies at least one second target candidate from at least the one first target candidate based on a distance from the terminal apparatus to the captured target.

19 Claims, 24 Drawing Sheets

FIG. 5

| FACILITY ID | FACILITY POSITION INFORMATION | | HEIGHT [m] | MOST RECENT REPLACEMENT DATE | MOST RECENT PATROL DATE | CHECKPOINT |
|---|---|---|---|---|---|---|
| | LATITUDE | LONGITUDE | | | | |
| ... | ... | ... | ... | | | |
| 104 | 35.6582 | 139.7456 | 10 | 2008/06 | 2010/03 | RUST ON TRANSFORMER |
| 105 | 35.6582 | 139.7457 | 8 | 2000/03 | 2009/06 | CRACK ON INSULATOR |
| ... | ... | ... | ... | | | |
| 300 | 35.6583 | 140.7457 | 7 | 1990/08 | 2011/01 | TILT OF POLE |
| ... | ... | ... | ... | | | |

FIG. 6

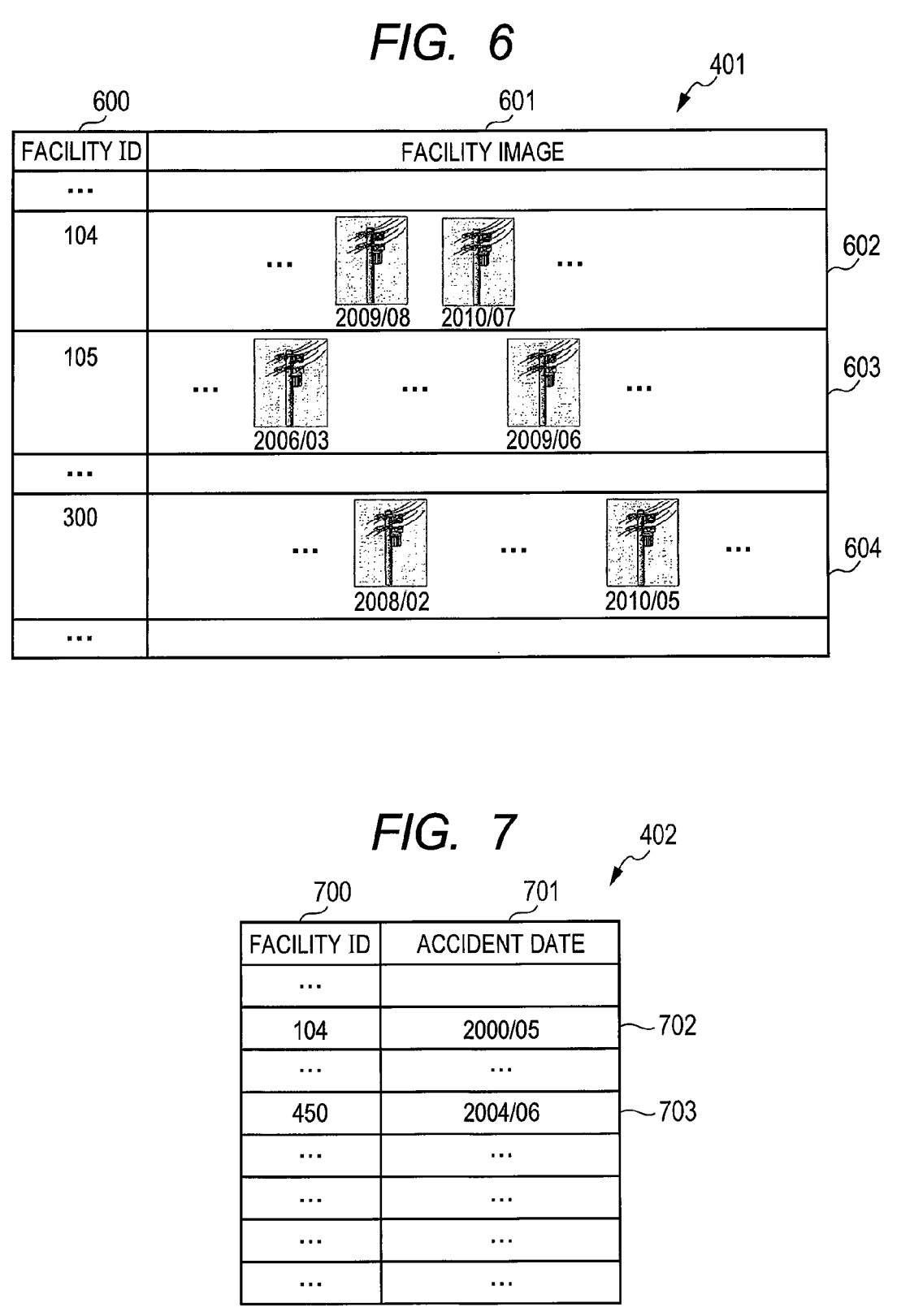

| FACILITY ID | FACILITY IMAGE |
|---|---|
| ... | |
| 104 | ... [2009/08] [2010/07] ... |
| 105 | ... [2006/03] ... [2009/06] ... |
| ... | |
| 300 | ... [2008/02] ... [2010/05] ... |
| ... | |

FIG. 7

| FACILITY ID | ACCIDENT DATE |
|---|---|
| ... | |
| 104 | 2000/05 |
| ... | ... |
| 450 | 2004/06 |
| ... | ... |
| ... | ... |
| ... | ... |

FIG. 26

| SHOP ID 2600 | POSITION INFORMATION 2601 2603 | | SHOP NAME 2604 | SHOP TYPE 2605 | COMMENT 2606 | SHOP URL 2607 |
|---|---|---|---|---|---|---|
| | LATITUDE 2602 | LONGITUDE | | | | |
| ... | ... | ... | ... | ... | ... | ... |
| 234 | 35.6579 | 139.7443 | AAA STORE | MISCELLANEOUS GOODS | 5% DISCOUNT FOR ALL ITEMS ON DECEMBER | http://www ... (2608) |
| 235 | 35.6579 | 139.7444 | BBB CAFE | COFFEEHOUSE | COFFEE RECOMMENDED | http://www ... (2609) |
| ... | ... | ... | ... | ... | ... | ... |
| 600 | 35.6512 | 140.7457 | CCC RESTAURANT | RESTAURANT | 10% DISCOUNT ON RESERVATION | http://www ... (2610) |
| ... | ... | ... | ... | ... | ... | ... |

2500

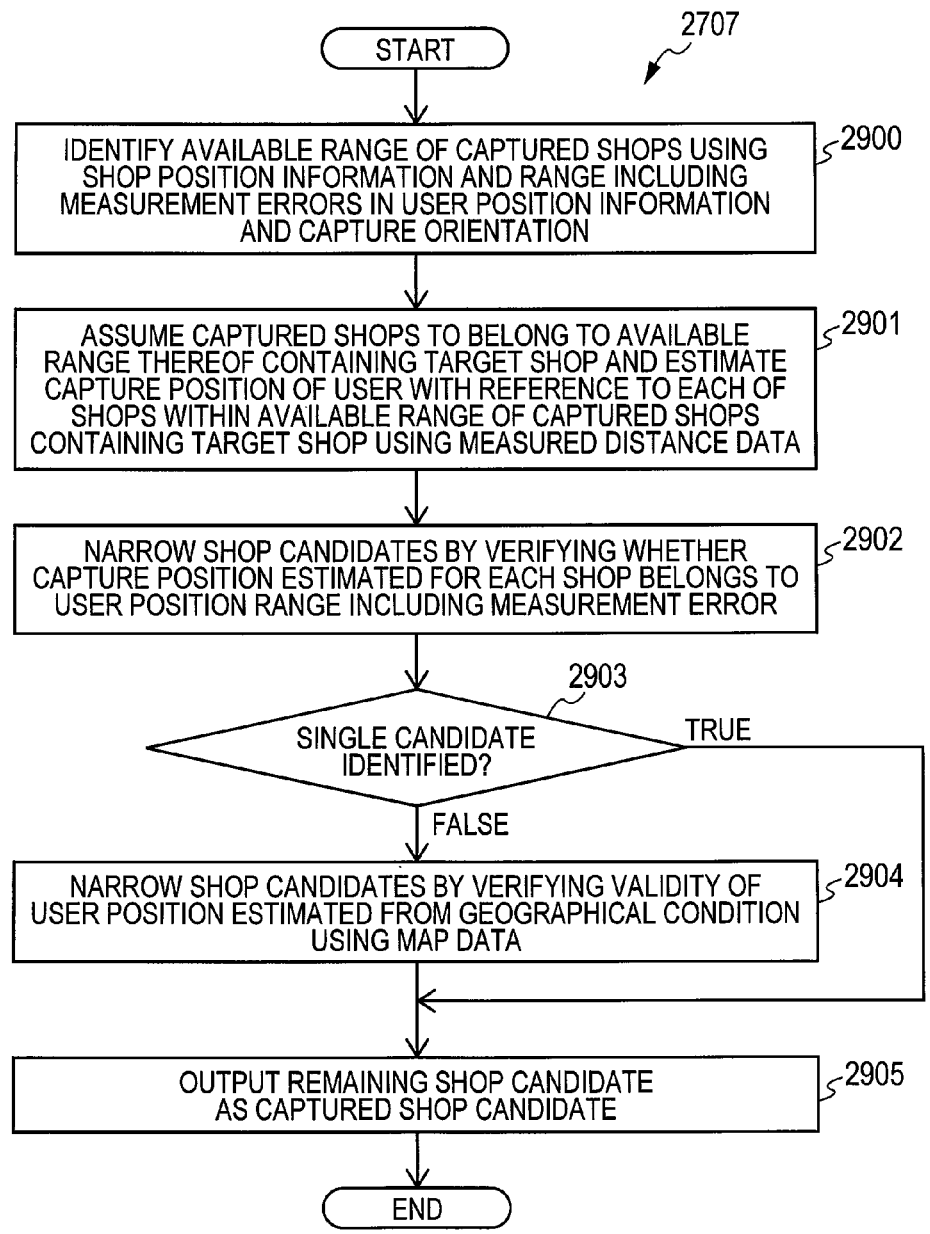

TARGET IDENTIFICATION SYSTEM TARGET IDENTIFICATION SERVER AND TARGET IDENTIFICATION TERMINAL

CLAIM OF PRIORITY

The present application claims priority from Japanese patent application JP 2012-094008 filed on Apr. 17, 2012, the content of which is hereby incorporated by reference into this application.

FIELD OF THE INVENTION

The present invention relates to a technology to identify a captured target. More particularly, the invention relates to a technology to automatically identify a target from positioning information acquired by a mobile terminal provided with a capturing function and a positioning function.

BACKGROUND OF THE INVENTION

Recently, there is a spreading use of a system that identifies a target corresponding to an image captured by a mobile information terminal having the capturing function and the positioning function and provides information about the target. Japanese Unexamined Patent Application Publication No. 2001-169164 discusses the background technology of this technical field. The method disclosed in Japanese Unexamined Patent Application Publication No. 2001-169164 calculates the position of an object based on a camera position resulting from the positioning, a distance between the camera and the object, and the orientation. The method searches for a database using the calculated object position as a key, retrieves a name corresponding to a zoom ratio, and superimposes the retrieved name on an image. Japanese Unexamined Patent Application Publication No. 2008-244660 discloses the system and the method calculates position information on a captured target based on position information, distance information, and orientation information, analyzes an image, and provides related information.

SUMMARY OF THE INVENTION

The methods described in Japanese Unexamined Patent Application Publication No. 2001-169164 and Japanese Unexamined Patent Application Publication No. 2008-244660 both identify an object using capturing position information acquired from the global positioning system (GPS), capturing orientation information measured by a digital compass, and object distance information found from the focal length and the zoom ratio of the camera. Actually, however, the position information, the orientation information, and the distance information all contain measurement errors. The methods described in Japanese Unexamined Patent Application Publication No. 2001-169164 and Japanese Unexamined Patent Application Publication No. 2008-244660 provide no solution for measurement errors and degrade the accuracy to identify an object.

Power distribution facilities include many facilities such as utility poles that are densely distributed over a wide range. Consider a system that automatically provides information about a captured facility to support patrol and inspection tasks as maintenance tasks for the facilities. If the above-mentioned methods are applied to the system, significant measurement errors may result from the position information, the orientation information, and the distance information because the facilities are densely distributed. The identification accuracy degrades.

The present invention has been made in consideration of the foregoing. It is, therefore, an object of the invention to provide a target identification system and a target identification method capable of automatically and highly precisely identifying a target based on position information, orientation information, and a distance to a capture target acquired from a mobile terminal provided with a capturing function and a positioning function.

A representative example of the invention follows. A target identification system includes: a computer connected to a network; and a terminal apparatus connected to the network. The computer includes an interface connected to the network, a processor connected to the interface, and a storage apparatus connected to the processor. The storage apparatus retains position information about a plurality of targets. The terminal apparatus includes: a capturing portion that captures an image of the target; a position information acquisition portion that acquires information about a position to capture an image of the target; an orientation information acquisition portion that acquires information about an orientation to capture an image of the target; and a communication portion that transmits an image captured by the capturing portion, position information acquired by the position information acquisition portion, and orientation information acquired by the orientation information acquisition portion to the computer via the network. The computer identifies at least one first target candidate as a candidate for the captured target from the targets based on position information about the targets, information about a position to capture an image of the target, and information about an orientation to capture an image of the target. The computer identifies at least one second target candidate as a candidate for the captured target from at least the one first target candidate based on a distance from the terminal apparatus to the captured target. The computer transmits information about the second identified target candidate to the terminal apparatus. The terminal apparatus further includes a display portion that displays information about the second identified target candidate.

A representative embodiment of the invention can automatically and highly accurately identify a capture target based on position information, orientation information, and a distance to a capture target.

BRIEF DESCRIPTION OF THE DRAWINGS

FIG. 5 is an explanatory diagram illustrating a configuration of facility situation data contained in the database according to the first embodiment of the invention;

FIG. 6 is an explanatory diagram illustrating a configuration of facility image data contained in the database according to the first embodiment of the invention;

FIG. 7 is an explanatory diagram illustrating a configuration of log data contained in the database according to the first embodiment of the invention;

FIG. 13 is an explanatory diagram illustrating a process a capture target identification program according to the first embodiment of the invention performs to identify an available range of captured facilities containing a target facility, in which

FIG. 16 is an explanatory diagram illustrating a process the capture target identification program according to the first embodiment of the invention performs to verify validity of a user position based on geographical conditions, in which

FIG. 26 is an explanatory diagram illustrating a configuration of shop data contained in the database according to the third embodiment of the invention;

FIG. 29 is a flowchart illustrating a process performed in the shop information provision system according to the third embodiment of the invention to identify a capture target shop.

DETAILED DESCRIPTION OF THE PREFERRED EMBODIMENTS

Embodiments of the present invention will be described in further detail with reference to the accompanying drawings.

First Embodiment

The first embodiment exemplifies a patrol support system. During patrol or inspection on a utility pole in the power distribution facility, the patrol support system supports the patrol by automatically providing information about a captured target facility and automatically allocating a facility ID to the captured facility image to store the image.

Figure 1:
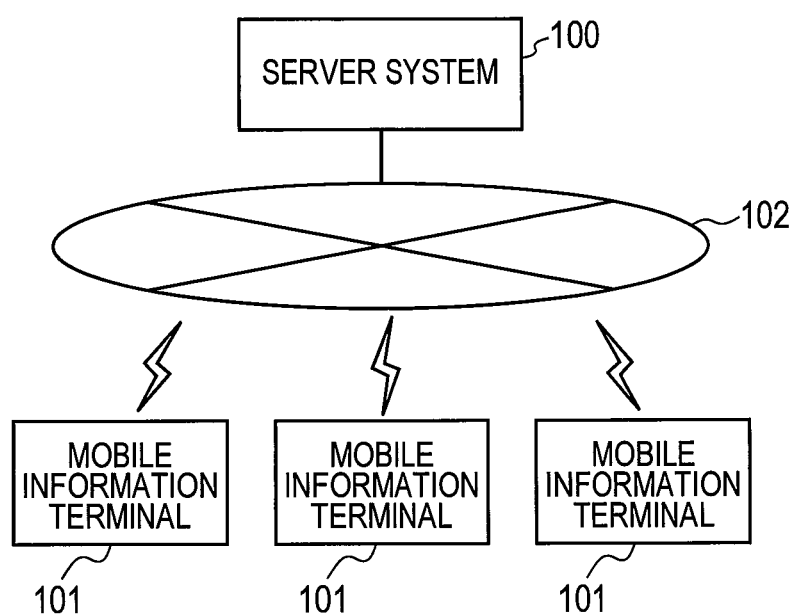
FIG. 1 is a block diagram illustrating an overall configuration of a patrol support system according to a first embodiment of the invention.

FIG. 1 is a block diagram illustrating an overall configuration of the patrol support system according to the first embodiment of the invention.

The patrol support system includes a server system 100 and more than one mobile information terminal 101. These are connected via a network 102. According to the example in FIG. 1, three mobile information terminals 101 are connected. The number of mobile information terminals 101 to be connected is not limited thereto. Components of the system will be described.

Figure 2:
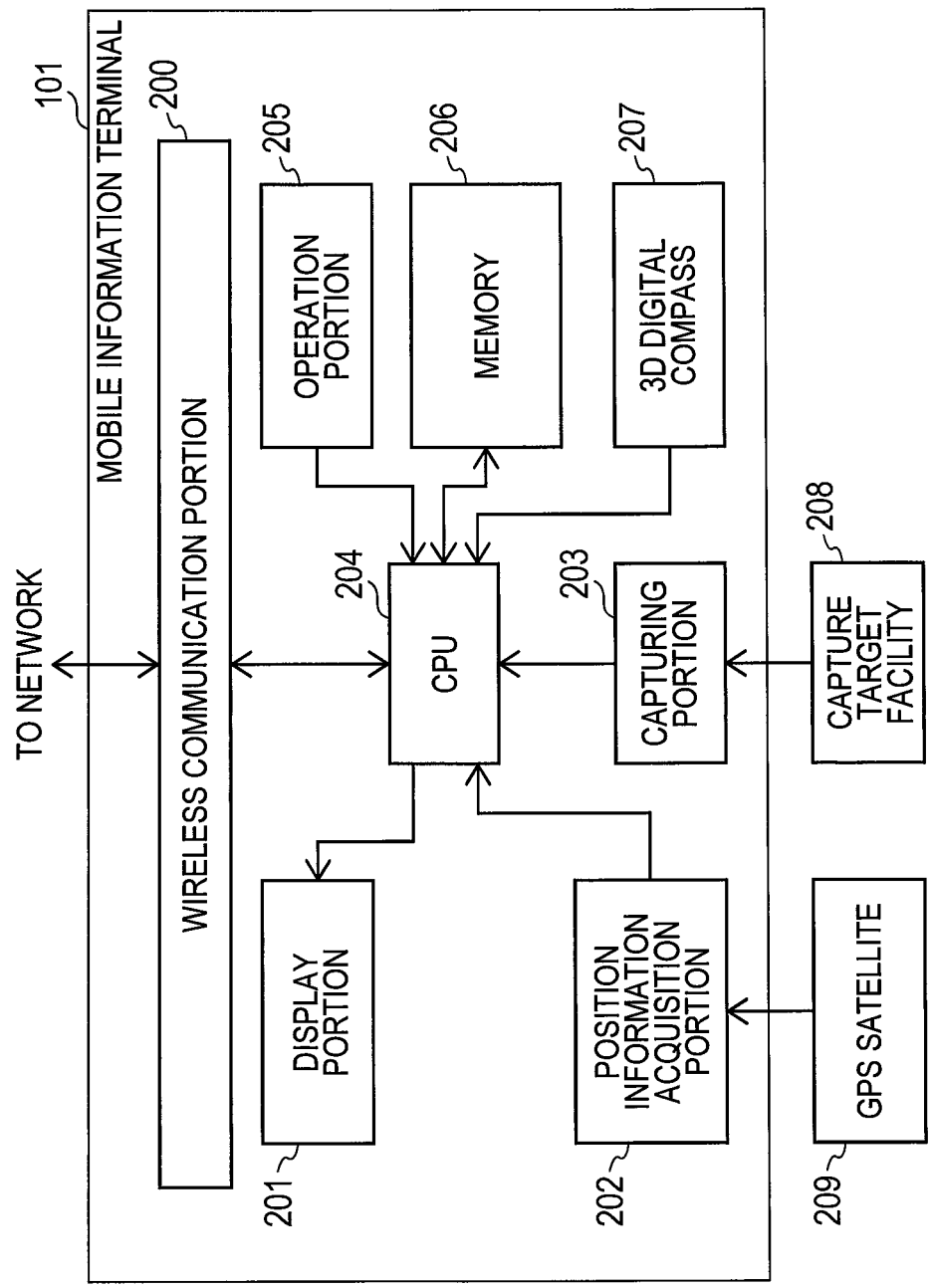
FIG. 2 is a block diagram illustrating a configuration of a mobile information terminal included in the patrol support system according to the first embodiment of the invention.

FIG. 2 is a block diagram illustrating a configuration of the mobile information terminal 100 included in the patrol support system according to the first embodiment of the invention.

The mobile information terminal 101 includes a wireless communication portion 200, a display portion 201, a position information acquisition portion 202, a capturing portion 203, a central processing unit (CPU) 204, an operation portion 205, memory 206, and a three-dimensional (3D) digital compass 207. The display portion 201 such as a display provides a user with a captured image and facility information. The position information acquisition portion 202 acquires position information from a GPS satellite 209. The capturing portion 203 such as a digital still camera captures a capture target facility 208. The CPU 204 controls an overall process. The operation portion 205 such as a button or a touch panel enables user's input operation. The memory 206 is equivalent to a nonvolatile storage such as flash memory and stores image data and facility information.

The 3D digital compass 207 acquires the orientation of the mobile information terminal 101, namely, the orientation of the capturing portion 203.

Specifically, the mobile information terminal 101 is equivalent to a mobile terminal such as a digital camera, a mobile telephone, or a personal digital assistant (PDA). The position information acquisition portion 202 includes a reception circuit. The position information acquisition portion 202 receives a radio wave from the GPS satellite 209 and measures a distance from the received radio wave. The position information acquisition portion 202 thereby acquires position information such as the latitude and the longitude indicating the position of the mobile information terminal.

The CPU 204 acquires position information from the position information acquisition portion 202. The CPU 204 acquires information such as a captured image and a capture situation from the capturing portion 203. The CPU 204 acquires information such as the capture orientation from the 3D digital compass 207. The CPU 204 stores the acquired information in the memory 206. The CPU 204 transmits the information to the server system 100 via the wireless communication portion 200 and the network 102 connected to it. The CPU 204 acquires information about a target facility from the server system 100 via the wireless communication portion 200 and the network 102 connected to it. The CPU 204 stores the acquired information in the memory 206. The CPU 204 allows the display portion 201 to display an image supplied with the acquired information about the target facility. These processes will be described later.

Figure 3:
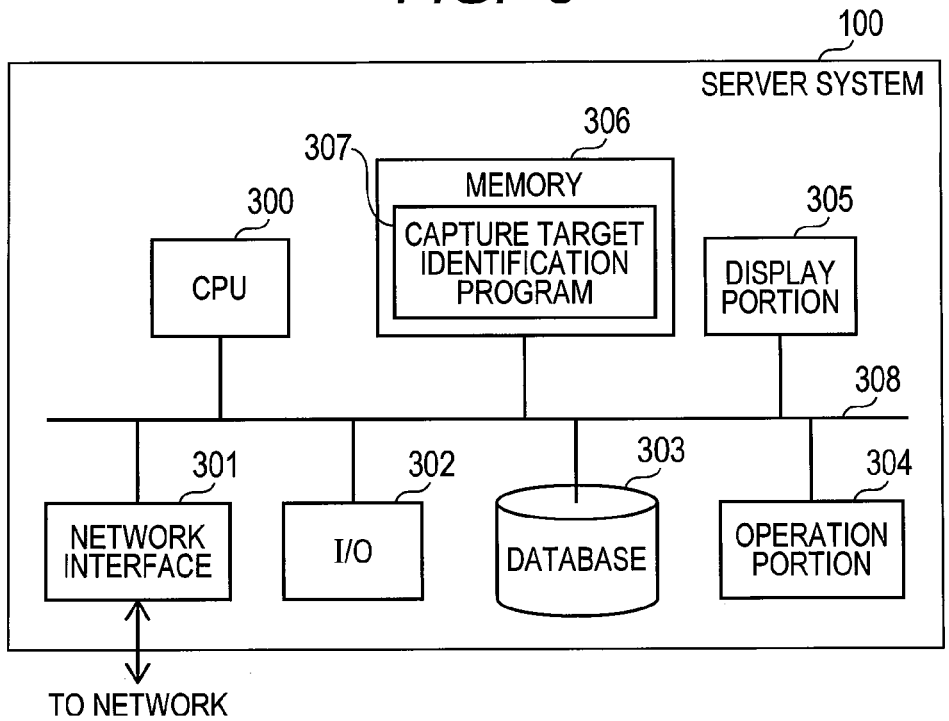
FIG. 3 is a block diagram illustrating a configuration of a server system included in the patrol support system according to the first embodiment of the invention.

FIG. 3 is a block diagram illustrating a configuration of the server system 100 included in the patrol support system according to the first embodiment of the invention.

The server system 100 includes a CPU 300, a network interface 301, an input/output (I/O) portion 302, a database 303, an operation portion 304, a display portion 305, memory 306, and a data bus 308. The CPU 300 controls the whole of the server system 100. The network interface 301 provides connection to other devices. The I/O portion 302 enables connection to an external device such as a USB device. The database 303 stores information about facilities, map information, and facility images. The operation portion 304 such as a keyboard and a mouse enables user input operation. The display portion 305 displays a process result and a log. The memory 306 is equivalent to a nonvolatile storage. The data bus 308 connects the components 300 through 306 with each other. The memory 306 stores a capture target identification program 307. The CPU 300 performs this program.

The database 303 may be configured on a storage device such as a hard disk drive. At least part of the database 303 may be copied to the memory 306 as needed, for example, according to a process performed by the capture target identification program 307.

According to the embodiment, a patroller carries the mobile information terminal 101 during patrol and captures the capture target facility 208 using the capturing portion 203. At the same time, the position information acquisition portion 202 acquires the position information from the GPS satellite 209. The 3D digital compass 207 acquires the capture orientation. The CPU 204 transmits the information to the server system 100 in FIG. 1 via the wireless communication portion 200 and the network 102. On the server system 100, the CPU 300 performs the capture target identification program 307 stored in the memory 306. The capture target identification program 307 identifies the captured facility using the above-mentioned information. The capture target identification program 307 searches the database 303 for information about the captured facility and transmits the retrieved information to the mobile information terminal 10 via the network 102. The mobile information terminal 101 displays the received information on the display portion 201. The server system 100 associates a facility ID with the identified captured facility image and stores the image in the database 303. The process will be described later in detail.

Figure 4:
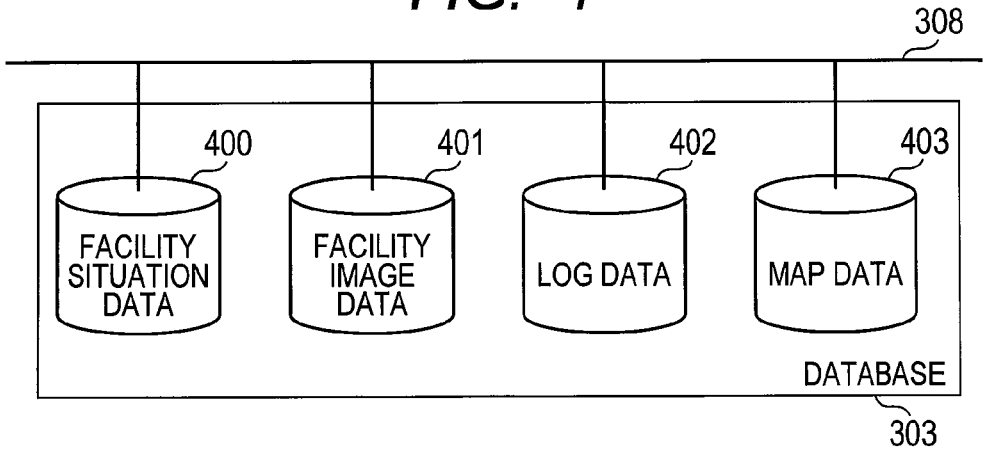
FIG. 4 is a block diagram illustrating a configuration of a database according to the first embodiment of the invention.

With reference to FIGS. 4, 5, and 6, the following describes an example configuration of the database 303 in the server system 100 in FIG. 3.

FIG. 4 is a block diagram illustrating a configuration of the database 303 according to the first embodiment of the invention.

The database 303 includes facility situation data 400, facility image data 401, log data 402, and map data 403.

The facility situation data 400 contains an installation position of a patrol target facility, a height thereof, a maintenance situation, and a chronological state.

FIG. 5 is an explanatory diagram illustrating a configuration of the facility situation data 400 contained in the database 303 according to the first embodiment of the invention.

The facility situation data 400 contains data concerning a utility pole subject to patrol or inspection in the power distribution facility. The facility situation data 400 stores facility ID 500, facility position information 501, facility height 504, most recent replacement date 505, most recent patrol date 506, and checkpoint 507 for patrol or inspection. These items are associated with each other.

The facility position information 501 contains latitude 502 and longitude 503. The facility position information 501 and the facility height 504 provide the height from the ground to the top of the facility and are used to identify a captured facility.

In FIG. 5, the facility situation data 400 is configured as described above but is not limited thereto. The facility situation data 400 may save information to be supplied to the mobile information terminal 101 as needed during patrol or inspection. Each of records 508, 509, and 510 exemplifies a set of data stored in the facility situation data 400. For example, the record 508 provides data concerning a facility identified by value 104 as the facility ID 500. According to this example, the facility with facility ID 104 is installed at a latitude of 35.6582 degrees and a longitude of 139.7456 degrees. The facility height is 10 m. The facility was last replaced on July, 2008. The facility was last patrolled on March, 2010. The patrol or the inspection needs to check for rust on a transformer attached to the facility. The records 590 and 510 also contain similar information about corresponding facilities.

The facility position information 501 and the height 504 are supplied in advance. If a new facility is installed, the facility position information 501 and the height 504 concerning the new facility are added to the facility situation data 400. The facility situation data 400 remains unchanged unless the facility is moved, removed, or replaced along with a shape modification. By contrast, the most recent replacement date 505, the most recent patrol date 506, and the checkpoint 507 are updated each time the facility is replaced or a patroller patrols the facility.

The mobile information terminal 101 captures a facility image during patrol or inspection. The facility image data 401 stores the captured facility image in association with the facility ID. FIG. 6 is an explanatory diagram illustrating a configuration of the facility image data 401 contained in the database 303 according to the first embodiment of the invention.

The facility image data 401 stores a facility ID 600 and a facility image 601 corresponding to the facility ID along with a capture date. The configuration of the facility image data 401 in FIG. 6 is just an example. The configuration of the facility image data according to the invention is not limited thereto. For example, the facility image data 401 may contain a comment made by a patroller while capturing the facility. Records 602, 603, and 604 exemplify data stored in the facility image data 401. For example, the record 602 stores facility image data concerning a facility identified by value 104 as the facility ID 600. According to this example, the record 602 stores a facility image captured on August, 2009 and a facility image captured on July, 2010. The records 603 and 604 also store similar facility image data.

FIG. 7 is an explanatory diagram illustrating a configuration of the log data 402 contained in the database 303 according to the first embodiment of the invention.

According to the example in FIG. 7, the log data 402 stores log information about facility accidents. The log data 402 stores a facility ID 700 and an accident date 701 corresponding to the facility ID 700. Records 702 and 703 exemplify the log data 402. For example, the record 702 stores date 2000/05 (May, 2000) of the past accident on a facility identified by value 104 for the facility ID 700. The record 703 stores date 2004/06 (June, 2004) of the past accident on a facility identified by value 450 for the facility ID 700. The log data 402 in this example notifies the mobile information terminal that care must be taken to patrol or inspect the facilities in consideration of the past accidents on these facilities. However, this is just an example of the log data. The log data 402 may store other information.

The map data 403 stores position information about roads and buildings similarly to general GIS (Graphical Information System) databases and a detailed description is omitted for simplicity.

Figure 13A:
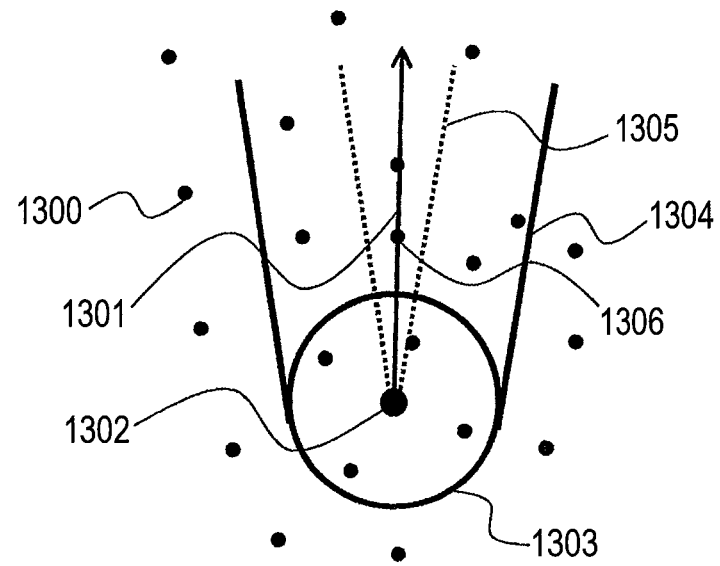
FIG. 13A illustrates facility placement on a map and FIG. 13B illustrates possibility of captured facilities.
Figure 13B:
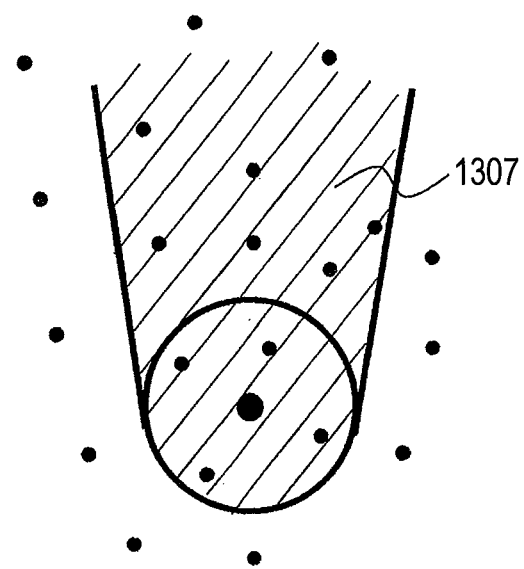

The memory 306 or the database 303 also contains error information (not shown). Specifically, the error information denotes an error in the position information acquired by the position information acquisition portion 202, an error in the orientation information acquired by the 3D digital compass 207, and an error in the distance information about the distance to the capture target facility 208. The method of calculating the distance information will be described later. Different models of the mobile information terminals 101 may be connected to the network 102. If errors differ from model to model, the error information corresponding to each model is stored. The error information may represent an error value itself or may contain a parameter or a calculation expression needed to calculate an error. The error information may be previously stored in the memory 306. Alternatively, the error information may be acquired from the mobile information terminal 101 as needed and may be stored in the memory 306. With reference to FIGS. 13A and 13B, for example, a later description will deal with an error value and a specific process to identify a capture target facility using the error value.

The following describes an overall process in the patrol support system according to the embodiment based on the above-mentioned configuration.

Figure 8:
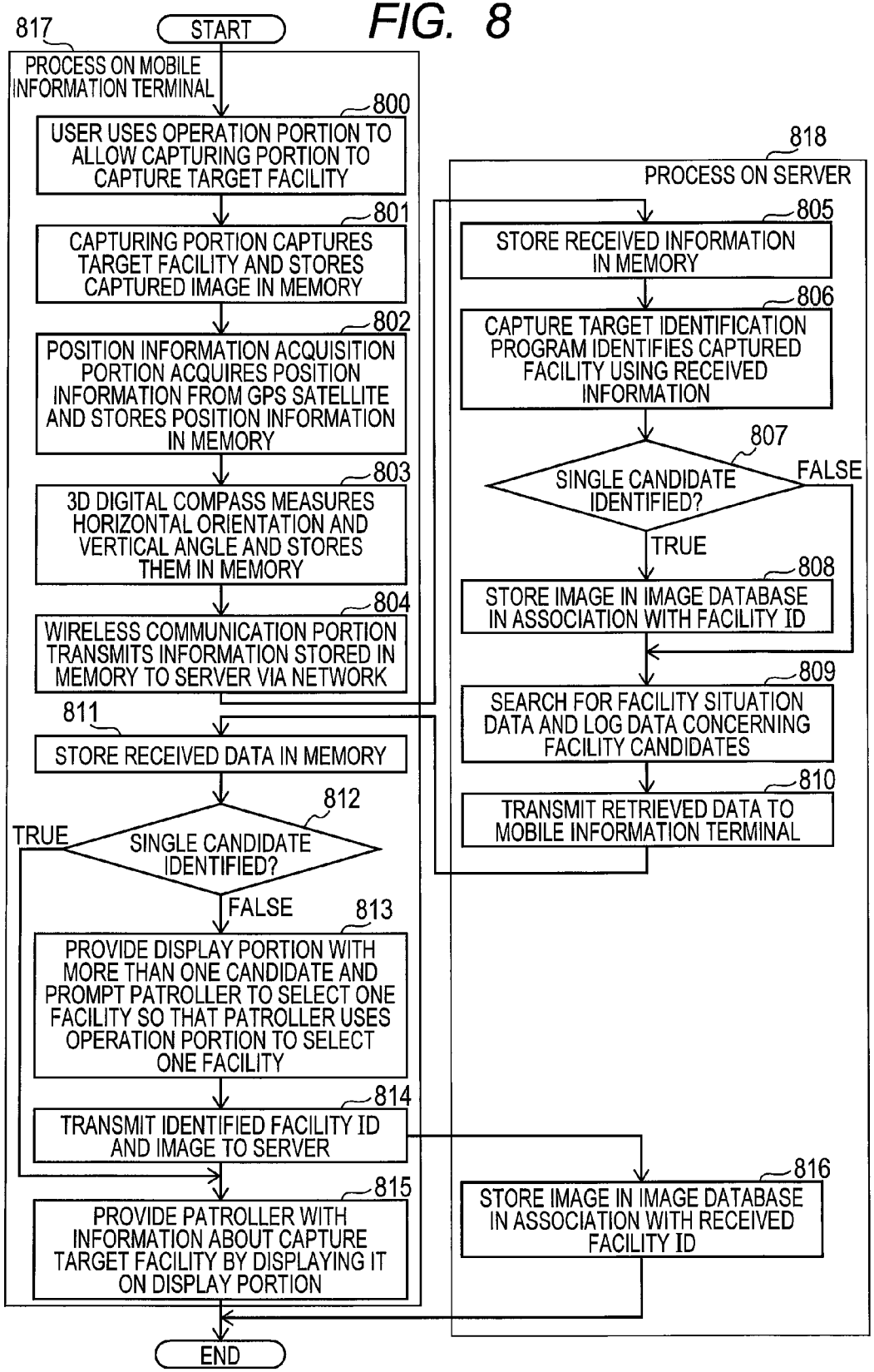
FIG. 8 is a flowchart illustrating a process performed in the patrol support system according to the first embodiment of the invention.

FIG. 8 is a flowchart illustrating a process performed in the patrol support system according to the first embodiment of the invention.

Specifically, FIG. 8 provides an example process that assists in patrol or inspection on a utility pole in the power distribution facility. For this purpose, the process automatically provides information about a captured target facility and automatically allocates a facility ID to the captured facility image to store the image. Step 817 for the mobile information terminal 101 includes steps 800, 801, 802, 803, 804, 811, 812, 813, 814, and 815. Step 818 for the server system 100 includes steps 805, 806, 807, 808, 809, 810, and 816. The CPU 204 performs and controls processes on the mobile information terminal 101. The CPU 300 performs and controls processes on the server system 100.

First, the mobile information terminal 101 starts steps 800, 801, 802, 803, and 804.

A user (patroller) on patrol or inspection operates the operation portion 205 of the mobile information terminal 101 near a capture target facility to allow the capturing portion 203 to capture the target facility 208 (step 800).

The capturing portion 203 receives the capture instruction from the user, captures the target facility 208, and acquires a captured image and capture conditions (the zoom ratio and the focal length of the camera, the capturing element size, and the capture date). The capturing portion 203 stores the captured image and the capture conditions in the memory 206 (step 801).

Figure 9:
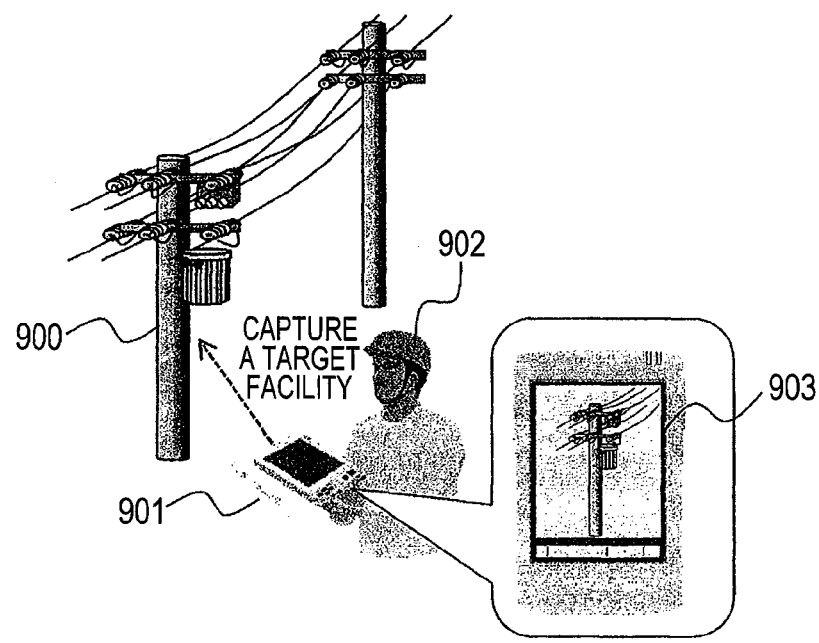
FIG. 9 is an explanatory diagram illustrating how a user of the patrol support system according to the first embodiment of the invention captures a target facility.

FIG. 9 is an explanatory diagram illustrating how a user (patroller) of the patrol support system according to the first embodiment of the invention captures a target facility. Specifically, FIG. 9 illustrates the operation performed by the user (patroller) at step 801 in FIG. 8. As illustrated in FIG. 9, a user (patroller) 902 visits near a facility 900 to be patrolled or inspected and captures the facility 900 using a mobile information terminal 901. The user can acquire a captured image 903 of the facility, for example.

In response to the capture instruction from the user, the position information acquisition portion 202 acquires position information about the mobile information terminal 101 from the GPS satellite 209 and stores the position information in the memory 206 (step 802). Specifically, the position information acquisition portion 202 receives a radio wave from the GPS satellite 209 and measures a distance based on the received radio wave to calculate the latitude and the longitude corresponding to the mobile information terminal 101.

In response to the capture instruction from the user, the 3D digital compass 207 measures a horizontal orientation and a vertical angle and stores them in the memory 206 (step 803).

The memory 206 stores the information (captured image, position information about the mobile information terminal, capture orientation, and capture conditions) acquired at steps 800 through 803. The wireless communication portion 200 transmits the stored information to the server system 100 via the network 102 (step 804).

Control then proceeds to steps 805, 806, 807, 808, 809, and 810 performed on the server system 100.

The server system 100 receives the information (captured image, position information about the mobile information terminal, capture orientation, and capture conditions) from the mobile information terminal 101 and temporarily stores the information in the memory 306 (step 805).

The CPU 300 performs the capture target identification program 307 stored in the memory 306. The capture target identification program 307 identifies the captured facility using the information (captured image, position information about the mobile information terminal, capture orientation, and capture conditions) stored in the memory 306 and data stored in the database 303 (step 806). The capture target identification program 307 identifies a single target facility or provides several candidates using the information (captured image, position information about the mobile information terminal, capture orientation, and capture conditions) stored in the memory 306 and data stored in the database 303. If a single target facility cannot be found, the capture target identification program 307 provides the user with several candidates and prompts the user to select one to finally identify a single facility. The process of the capture target identification program 307 will be described later in detail.

The server system 100 checks a processing result of the capture target identification program 307 as described above to determine whether a single target facility can be identified (step 807).

If a single target facility can be identified, the server system 100 stores the captured image appended with the capture date information in the facility image data 401 in association with the identified facility ID (step 808). For example, the capture target identification program 307 may identify a patrol target facility 900 captured in FIG. 9 as the facility distinguished by facility ID 104. In this case, the server system 100 adds the captured image to the record 602 that stores image data concerning facility ID 104 of the facility image data 401 in FIG. 6.

Conversely, the server system 100 may not identify a single target facility at step 807 and leave several candidates. In this case, the server system 100 skips over step 808 and proceeds to step 809.

The server system 100 searches the facility situation data 400 and the log data 402 for data concerning the identified facility or several facility candidates (step 809). If the single facility is identified, the server system 100 searches for only data concerning the facility. If several candidates are provided, the server system 100 searches for data concerning the target facility candidates.

The server system 100 transmits the facility candidate data retrieved at step 809 to the mobile information terminal 101 via the network interface 301 and the network 102 (step 810).

The mobile information terminal 101 then performs steps 811, 812, 813, 814, and 815.

The wireless communication portion 200 of the mobile information terminal 101 receives the facility candidate data transmitted from the server system 100 via the network 102. The wireless communication portion 200 stores the received data in the memory 206 (step 811).

The mobile information terminal 101 determines whether a single facility candidate is identified as a capture target (step 812). Specifically, a single facility candidate can be identified if the mobile information terminal 101 receives the data concerning only the single facility from the server system 100. Conversely, the mobile information terminal 101 can assume several facility candidates available if the received data concerns more than one facility.

A processing result at step 812 may denote that more than one facility candidate is available as a capture target. In this case, the mobile information terminal 101 provides the display portion 201 with more than one candidate as well as the peripheral map and prompts the user (patroller) to select one of the facilities as the candidates. The user operates the operation portion 205 to select one of the facilities (step 813).

Figure 10:
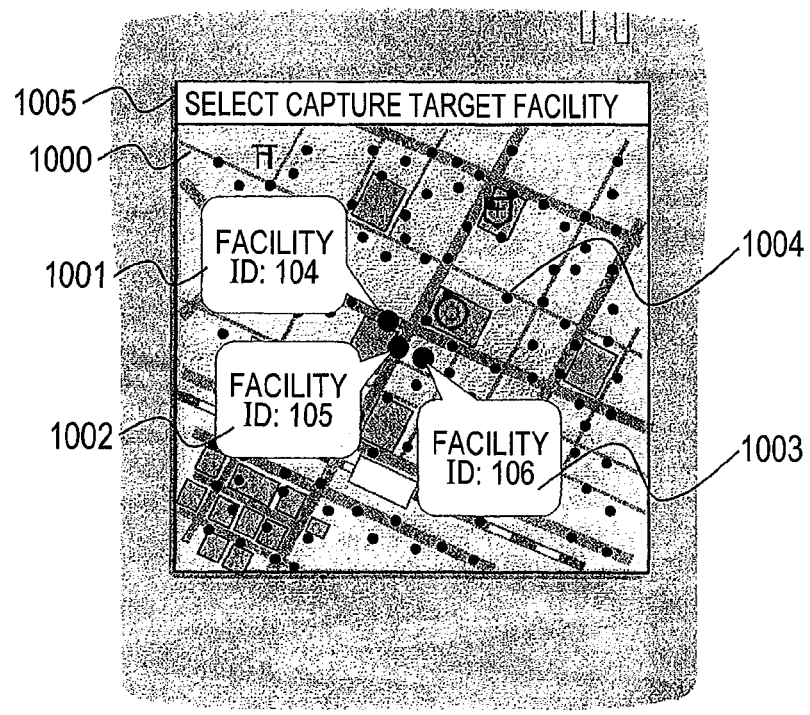
FIG. 10 is an explanatory diagram illustrating how a display portion according to the first embodiment of the invention displays facility candidates to be captured.

FIG. 10 is an explanatory diagram illustrating how the display portion 201 according to the first embodiment of the invention displays facility candidates to be captured. FIG. 10 provides an example screen displayed at step 813.

As illustrated in FIG. 10, the display portion 201 displays a map 1000 around the user position. A facility 1004 is positioned on the map 1000. For example, FIG. 10 highlights three facility candidates 1001, 1002, and 1003. The facility candidate 1001 corresponds to facility ID 104. The facility candidate 1002 corresponds to facility ID 105. The facility candidate 1003 corresponds to facility ID 106. The display shows a balloon message that indicates the facility ID and corresponds to the position of each facility. The top of the display shows an instruction 1005 that prompts the user to select a facility to be captured from the candidates.

The display for the mobile information terminal 101 illustrated in FIG. 10 has the touch panel function. In this case, the user follows the instruction 1005 and views the map 1000 to recognize the surrounding situation. The user can select the facility by touching any of the balloon messages corresponding to the facility candidates 1001, 1002, and 1003. The embodiment assumes the mobile information terminal 101 to include the touch panel display. The embodiment is not limited thereto. For example, the mobile information terminal 101 may be provided with a button to enable user operation. In such a case, the display may provide facility candidates using a pull-down menu. The user may operate the button to select a facility.

At step 813, the mobile information terminal 101 identifies the single capture target facility when the user selects one of the candidates. The mobile information terminal 101 then transmits the identified facility ID and the captured image to the server system 100 from the wireless communication portion 200 via the network 102 (step 814). The mobile information terminal 101 may transmit only the facility ID because the captured image is already stored in the memory 306 of the server system 100.

The server system 100 receives the facility ID and the captured image from the mobile information terminal 101. The mobile information terminal 101 appends the capture date information to the captured image and stores the captured image in the facility image data 401 corresponding to the identified facility ID 600 (step 816). For example, suppose the user selects the facility with facility ID 104 in FIG. 10. In this case, the server system 100 adds the captured image to the record 602 of the facility image data 401 in FIG. 6 because the record 602 stores the image data concerning facility ID 104.

A processing result at step 812 may denote that the single capture target facility is identified. Alternatively, the process at step 814 may be performed. In such a case, the single facility is identified. The mobile information terminal 101 reads data concerning the identified capture target facility from the memory 206 and provides the user (patroller) with the data by displaying it on the display portion 201 (step 815).

Figure 11:
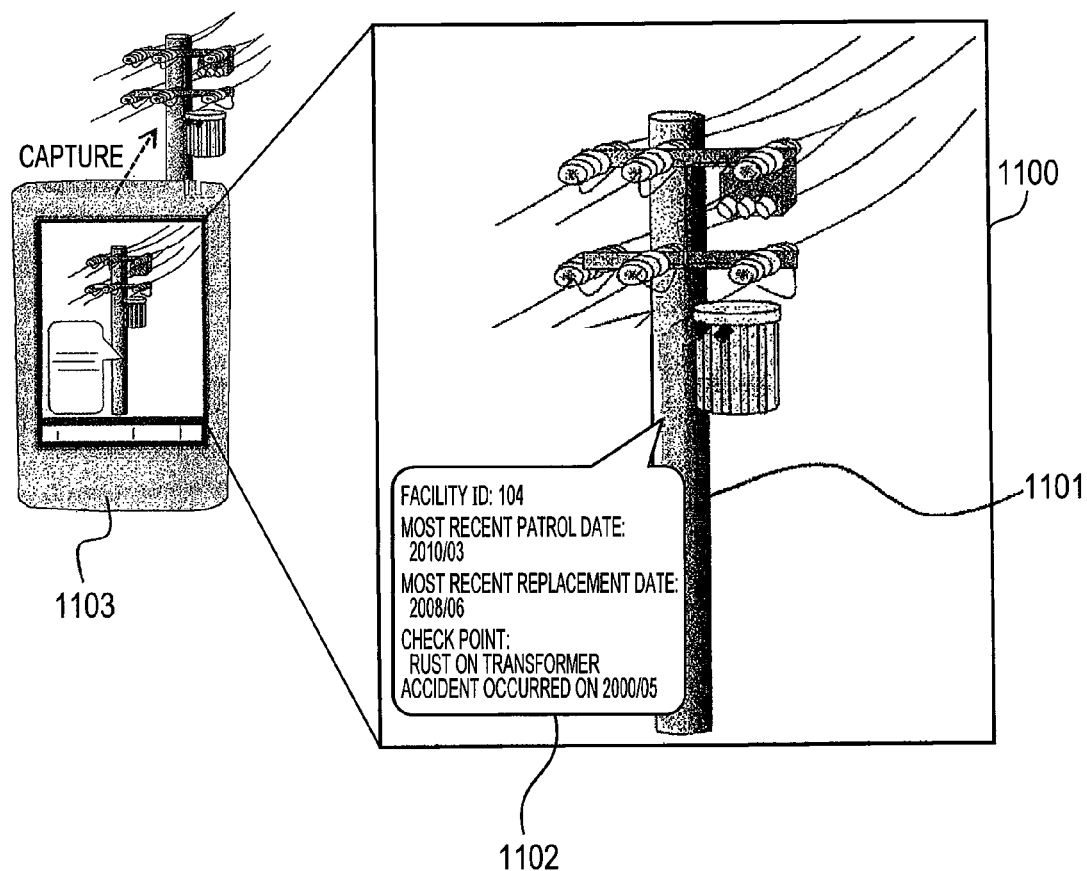
FIG. 11 is an explanatory diagram illustrating data about a patrol target facility displayed on the display portion of the mobile information terminal according to the first embodiment of the invention.

FIG. 11 is an explanatory diagram illustrating data, about a patrol target facility displayed on the display portion 201 of the mobile information terminal 101 according to the first embodiment of the invention.

A display portion 1100 of a mobile information terminal 1103 displays an image 1101 of the captured capture target facility and data 1102 concerning the target facility. In FIG. 11, the identified facility is distinguished by facility ID 104. The data 1102 concerning facility ID 104 is superimposed on the captured image 1101 of the identified facility. For example, the data 1102 shows data 508 concerning facility ID 104 of the facility situation data 400 in FIG. 5 and data 702 concerning facility ID 104 of the log data 402 in FIG. 7.

The user (patroller) just needs to capture a target facility using the mobile information terminal 101 during the patrol or inspection. The server system 100 automatically identifies the captured facility and retrieves data concerning the facility. The mobile information terminal 101 supplies the retrieved data. The user can conduct the patrol or inspection by referencing the supplied information. The patrol or inspection can be made more efficient. According to the example in FIG. 11, data concerning the facility is superimposed on the captured image. The embodiment is not limited thereto. Various methods are available. For example, the display portion 201 may provide a table of data instead of images. In addition to providing the information about the facility, the system can also automatically identify a captured facility and automatically store the captured image associated with the facility ID in the facility image data. The system thereby facilitates the management of facility states using facility images.

The following describes in detail the process the patrol support system performs to identify a capture target facility at step 806 of the flowchart in FIG. 8.

Figure 12:
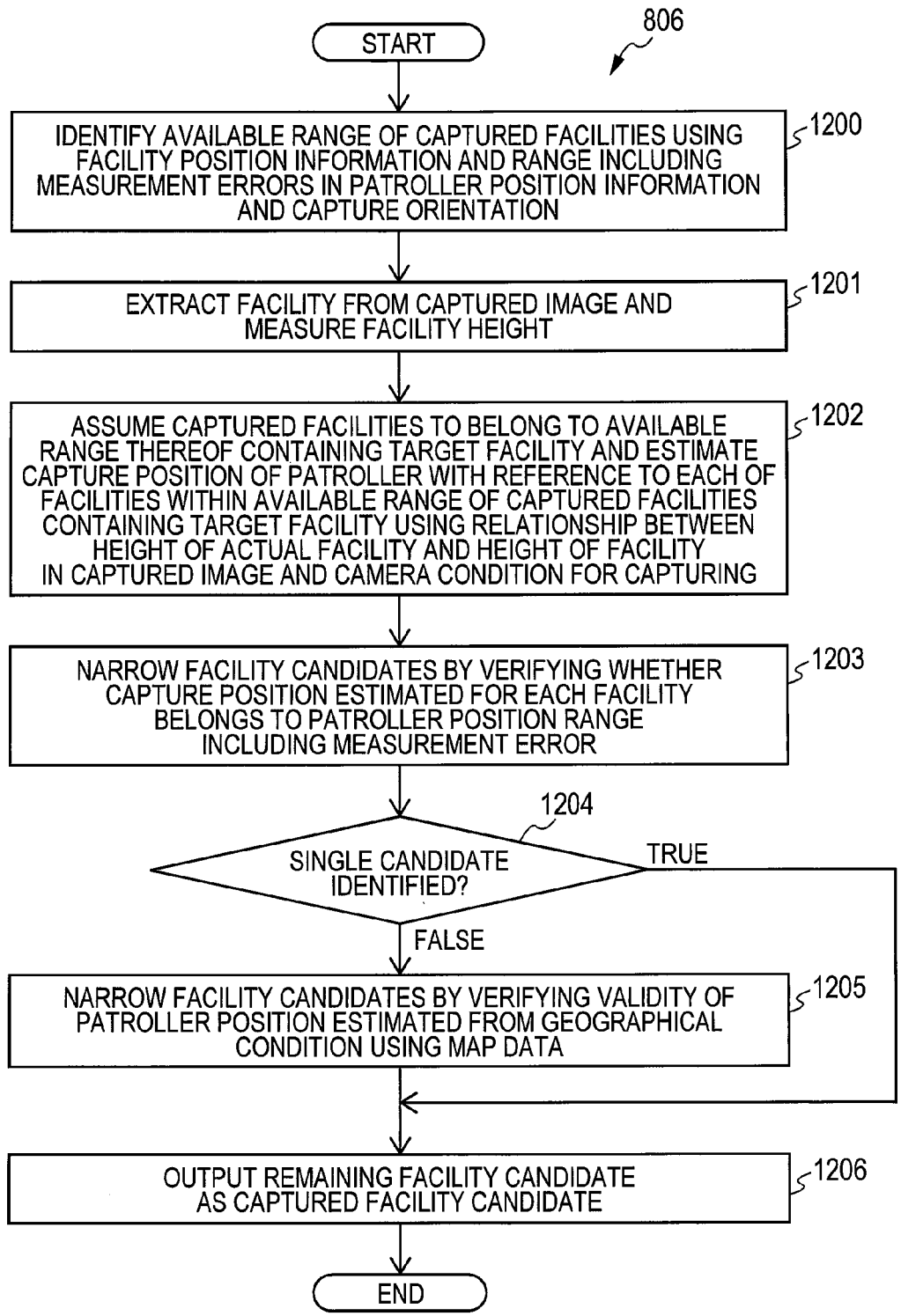
FIG. 12 is a flowchart illustrating a process performed in the patrol support system according to the first embodiment of the invention to identify a capture target facility.

FIG. 12 is a flowchart illustrating the process performed in the patrol support system according to the first embodiment of the invention to identify a capture target facility. Specifically, the following describes in detail the process performed at step 806 of the flowchart in FIG. 8.

The process in FIG. 12 starts when the CPU 300 performs the capture target identification program 307 stored in the memory 306. The capture target identification program 307 identifies a single captured facility or provides several candidates using the information (captured image, position information about the mobile information terminal, capture orientation, and capture conditions) stored in the memory 306 and data stored in the database 303 (step 806). If a single target facility cannot be found, the capture target identification program 307 provides the user with several candidates and prompts the user to select one to finally identify a single facility.

The capture target identification program 307 uses the position information about the user (patroller), namely, the position information about the mobile information terminal 101 and the Capture orientation stored in the memory to specify a range including their measurement errors. The capture target identification program 307 uses the facility position information 501 stored in the facility situation data 400 to identify an available range of captured facilities containing a target facility (step 1200).

FIG. 13 is an explanatory diagram illustrating a process the capture target identification program 307 according to the first embodiment of the invention performs to identify an available range of captured facilities containing a target facility. FIG. 13 provides a specific example of the process at step 1200 in FIG. 12.

FIG. 13A illustrates placement of facilities on the map. A facility 1300 is placed in the space. A user position 1302 in the space is plotted based on the user's position information the position information acquisition portion 202 acquired. A capture orientation 1301 is indicated with reference to the user position based on capture orientation information the 3D digital compass 207 acquired.

The captured facility can be easily identified as a facility A1306 found along the capture orientation 1301 from the user position 1302 if the position information and the capture orientation information are accurate. Actually, however, the position information acquired from the position information acquisition portion 202 and the capture orientation information acquired from the 3D digital compass 207 often contain measurement errors. For example, the GPS as an example of the position information acquisition portion 202 causes a measurement error of up to 100 m in the position information. A 3D digital compass causes a measurement error of approximately ±5 degrees. Specifications on errors are known according to products to be used. The captured facility may actually differ from the facility A1306 even if the position information and the capture orientation information as illustrated in FIG. 13 are acquired. Identifying an actually captured facility requires identifying a possible range of captured facilities in consideration of measurement errors.

The capture target identification program 307 calculates a user position information error range 1303 including an error range around the user position 1302. For example, suppose the position information acquisition portion 202 is known for having an error of 100 m. In this case, the capture target identification program 307 calculates a circle with a radius of 100 m around the user position 1302 as the user position information error range 1303. The user position information error range 1303 contains the actual user position.

A capture orientation error range 1305 can be found in consideration of an error in the capture orientation 1301. For example, suppose the 3D digital compass 207 is known for having an error of ±5 degrees. In this case, the capture target identification program 307 calculates the capture orientation error range 1305, namely, a range of ±5 degrees along the capture orientation 1301 with reference to the user position 1302.

The capture orientation error range 1305 includes the error of the capture orientation 1301 with reference to the user position 1302. The user position 1302 also includes an error calculated as the user position information error range 1303. That is, the captured facility corresponds to any of facilities contained in the range along the orientation equivalent to the capture orientation error range 1305 with reference to any points within the user position information error range 1303. The capture target identification program 307 calculates an error range 1304 of both data by a combination of the user position information error range 1303 and the capture orientation error range 1305. The error range 1304 is equivalent to a union of the capture orientation error range 1305 with reference to all points in the user position information error range 1303.

A shaded portion 1307 in FIG. 13B is equivalent to the error range 1304 of both data. The captured facility is likely to exist in this range. In other words, there is no possibility of capturing a facility outside the shaded portion 1307 if the actual measurement error is contained in the known error range.

The capture target identification program 307 extracts a target facility from the captured image and measures its height (step 1201). Suppose a utility pole to be an example of the target facility. Since the utility pole is a columnar facility, the capture target identification program 307 can easily extract the facility from the captured image using a simple template matching technique, for example. The capture target identification program 307 measures the facility height in the image, namely, the length between the top and the bottom of an image of the facility contained in the captured image. The facility height in the image is equivalent to the length between the hop and the bottom of an image of the facility contained in the captured image. According to the example of the utility pole, the user captures an image so that the captured image contains the whole of the utility pole from its base (crossing on the ground) to the top. The capture target identification program 307 extracts an image of the utility pole from the capture image and measures the image length between the base and the top of the utility pole.

There may be another method of measuring the facility height without performing the extraction process. For example, the user is forced to capture an image so that the height of the facility in the image corresponds to the height of the display of the mobile information terminal 101. In this case, the display height equals the height of the facility in the image without measuring the height.

The capture target identification program 307 assumes that the user uses the mobile information terminal 101 to capture facilities within an available range 1307 of captured facilities containing a target facility. The capture target identification program 307 estimates a range of capture positions of the user with reference to each of the facilities within an available range 1307 of captured facilities containing a target facility using the height 504 of the actual facility stored in the facility situation data 400, the height of the facility in the captured image calculated at step 1201 of the process, the camera condition (focal length, zoom ratio, and capturing element size) for capturing, and the error information (step 1202).

Figure 14:
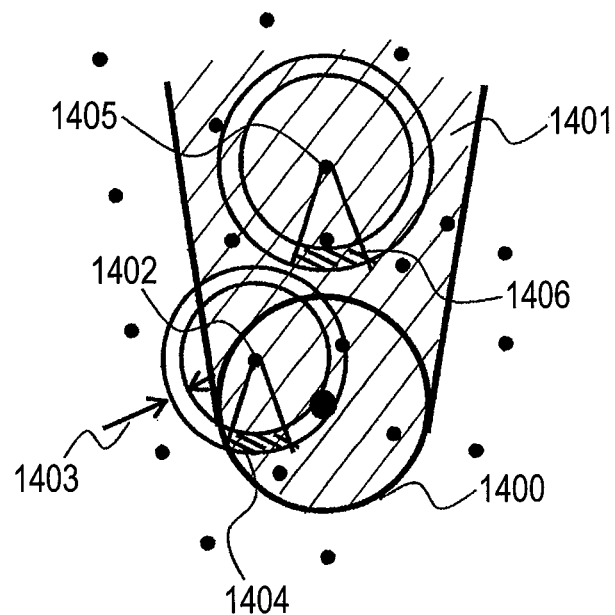
FIG. 14 is an explanatory diagram illustrating a process the capture target identification program according to the first embodiment of the invention performs to estimate a user's capturing position.

FIG. 14 is an explanatory diagram illustrating a process the capture target identification program 307 according to the first embodiment of the invention performs to estimate a user's capturing position. FIG. 14 illustrates a specific process image at step 1202 in FIG. 12.

The capture target identification program 307 assumes that the user uses the mobile information terminal 101 to capture the facilities within an available range 1401 of captured facilities containing a target facility. The range 1401 is found at step 1200 in FIG. 12 and is equivalent to the range 1307 in FIG. 13B. The capture target identification program 307 calculates a capturing position of the user (patroller) so that each facility matches the captured image.

For example, this process is performed on a facility a1402 in FIG. 14. The facility a1402 is assumed to be an object of the capturing portion 203 of the mobile information terminal 101. The capture target identification program 307 calculates distance d to the object using actual height H of the facility a1402, the height of the facility found at step 1201, and capturing conditions such as zoom ratio x of the camera, focal length f thereof, and the capturing element size (height h×width w).

Figure 15:
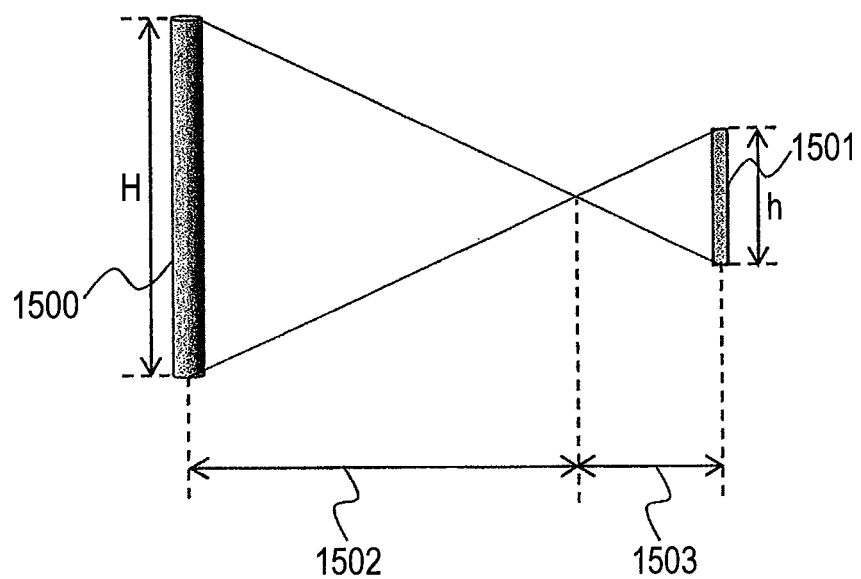
FIG. 15 is an explanatory diagram illustrating a method the capture target identification program according to the first embodiment of the invention performs to calculate a distance from the user to an object.

FIG. 15 is an explanatory diagram illustrating a method the capture target identification program 307 according to the first embodiment of the invention performs to calculate a distance from the user to an object. Specifically, FIG. 15 illustrates the relationship among distance d to an object, focal length f, and the capturing element size (height h×width w) if the height of the captured image is assumed to equal the height of the facility in the image. In FIG. 15, suppose that height H of an object 1500, height h of a capturing element 1501, and a focal length f1503 of the camera are given. Then, equation (1) below finds a distance d1502 to the object.

[Equation 1]

$$d = \frac{f \cdot H}{h} \quad (1)$$

The zoom ratio x of the camera may be given to indicate that the zoom function is used. In such a case, the focal length may be corrected according to the zoom ratio, for example. Equation (1) is applicable if the user captures an image so that the height h of the capturing element 1501 equals the height of the facility in the captured image. Actually, however, the user may not be able to capture an image under such a condition. A possible solution is to estimate a capturing range in the height direction in the image from the height of the facility in the image and the actual facility height if the height of the captured image differs from the height of the facility in the image. Specifically, the distance d1502 to the object can be found by replacing the height h of the capturing element 1501 in equation (1) with the height of the facility in the image.

Equation (1) is used to estimate distance d (object distance) from the user to the object regarding the facility a1402 in FIG. 14. Suppose that the object distance d and the capture orientation information have no error. Under this condition, the user's capturing position should be contained in a circle with radius d around the facility a1402 and the facility a1402 should exist on the capture orientation 1301 with reference to that capturing position. Actually, however, the capture orientation information contains an error such as the capture orientation error range 1305 as described above. In addition, the object distance d generally contains an error. The capture target identification program 307 estimates a range of capturing positions of the user in consideration of these errors.

The capture target identification program 307 estimates an error range of the object distance d. For example, the capture target identification program 307 may estimate an error range of the object distance d using predetermined parameters for error range estimation. For example, the capture target identification program 307 may estimate the error range using addition of a specified distance such as object distance d±10 m or using multiplication of a specified rate such as object distance d±10%. In this case, ±10 m or ±10% is a predetermined parameter for error range estimation. The error range of the object distance d is found as described above and is illustrated in FIG. 14 as a range 1403 between two concentric circles around the installation position of the facility a1402, for example.

The capture target identification program 307 calculates an estimated capture position 1404 for facility a using the capture orientation information and its error information for the error range 1403 of the object distance. Specifically, the capture target identification program 307 finds a set of points contained in the range 1403 so that the facility a1402 is contained in the capture orientation error range 1305 with reference to a point contained in the range 1403. The capture target identification program 307 calculates that set of points as the estimated capture position 1404, namely, the range of positions where the user was estimated to capture the facility a1402.

The capture target identification program 307 performs a similar process on a facility b1405 in FIG. 14 to calculate an estimated capture position 1406 of facility b, for example. Since the height depends on a facility, the size of a circle indicating the estimated object distance also depends on a facility. The capture target identification program 307 uses the same method to estimate user positions to capture the other facilities in the range 1401.

The capture target identification program 307 narrows candidates by verifying whether the user position information error range 1400 contains at least part of the capture positions estimated for the facilities (step 1203). At step 1202, the capture target identification program 307 calculates the estimated capture positions 1404 and 1406 for the facilities contained in the available range 1401 of captured facilities containing a target facility. For example, this signifies that the facility a1402 cannot be captured at any other positions than the estimated capture positions 1404 unless an actual error exceeds the error used for the calculation. The facility a1402 cannot be captured if the user cannot be present in the range of the estimated capture position 1404 at the time of capturing.

The capture target identification program 307 verifies whether at least part of the estimated capture positions is contained in the user position information error range 1400 measured by the GPS. The capture target identification program 307 narrows the facility candidates according to a verification result. For example, at least part of the estimated capture position 1404 for facility a is contained in the user position information error range 1400 as illustrated in FIG. 14. Therefore, the user might have captured the facility a1402 from any position contained in an overlap between both ranges. The capture target identification program 307 keeps the facility a1402 as a candidate because it is likely to be captured. On the other hand, the estimated capture position 1406 for facility b is not contained in the user position information error range 1400. The capture target identification program 307 excludes the facility b1405 from the candidates, assuming that the facility b1405 is not captured. The capture target identification program 307 narrows the facility candidates by similarly verifying the other facilities in the range 1401.

As a result of narrowing at step 1203, the capture target identification program 307 determines whether a single candidate is identified (step 1204).

When determining at step 1204 that more than one facility candidate remains, the capture target identification program 307 further narrows the facility candidates by using map data and verifying validity of the patroller position estimated from the geographical conditions (step 1205).

FIG. 16 is an explanatory diagram illustrating a process the capture target identification program 307 according to the first embodiment of the invention performs to verify validity of a user position based on geographical conditions. Specifically, FIG. 16 exemplifies the process at step 1205.

Figure 16A:
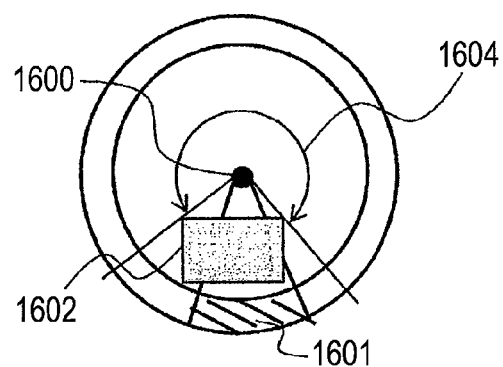
FIG. 16A illustrates a building contained in map data and FIG. 16B illustrates a road contained in map data.

At step 1205, the capture target identification program 307 further narrows the facility candidates by using map information and verifying whether the remaining facility candidates can be physically captured from the specified user position. In FIG. 16A, for example, the capture target identification program 307 searches for an obstacle such as a building or a mountain that may exist between a facility candidate 1600 and its estimated capture position 1601 using these positions as criteria in the map data 403. As a result, for example, a building 1602 may be found as illustrated in FIG. 16A. In this case, the facility candidate 1600 cannot be captured from the estimated capture position 1601. Therefore, the facility candidate 1600 is excluded as a candidate. For the purpose of this search, the map data 403 needs to contain information such as geographical features and building shapes.

Specifically, for example, the capture target identification program 307 identifies a range 1604 capable of viewing the facility candidate 1600 based on the shape of the building 1602 contained in the map data 403. The capture target identification program 307 excludes the facility candidate 1600 as a candidate if the viewable range 1604 does not overlap at least part of the estimated capture position 1601.

Figure 16B:
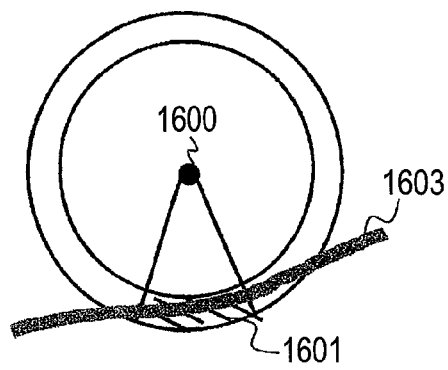

According to an example in FIG. 16B, the capture target identification program 307 confirms validity of the estimated position by verifying whether the user can pass through the estimated capture position 1601 for the facility candidate 1600. Specifically in FIG. 16B, the capture target identification program 307 searches the map data 403 for availability of a road at the estimated capture position 1601. If a road is found as illustrated in FIG. 16B, the user can exist at the estimated capture position. In this case, the capture target identification program 307 can confirm that the estimated capture position 1601 is valid and need not be excluded from the candidates. If the estimated capture position 1601 indicates a place that is not a road and prevents the user from passing through, the capture target identification program 307 excludes the facility candidate 1600 as a candidate, assuming that the facility candidate 1600 cannot be captured.

In addition to the example of a road in FIG. 16B, the capture target identification program 307 may identify an area (e.g., public area) accessible to the user and an area (e.g., private land) inaccessible to the user according to the map data 403. In such a case, the capture target identification program 307 determines whether at least part of the estimated capture position 1601 overlaps the range accessible to the user. If no overlap is found, the capture target identification program 307 can exclude the facility candidate 1600 as a candidate. As described above, the capture target identification program 307 narrows the candidates by verifying an obstacle between the facility and the estimated capture position or verifying a possibility of presence of the user at the estimated capture position.

One or more facilities may result from the narrowing according to the above-mentioned steps. The capture target identification program 307 outputs the resulting facilities as captured facility candidates (step 1206).

Figure 17:
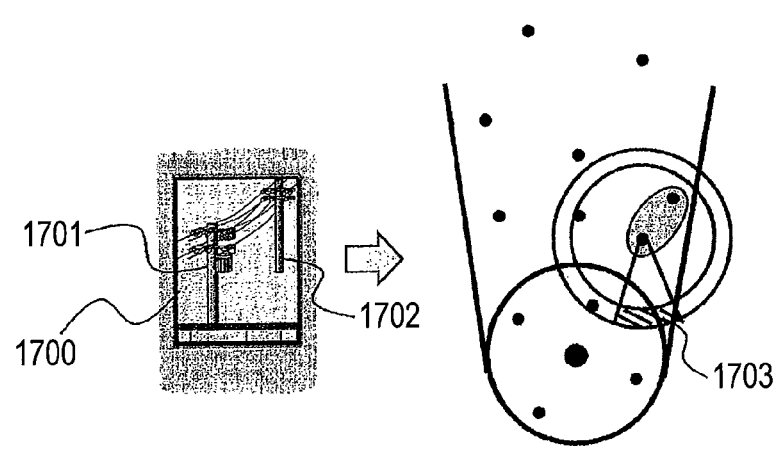
FIG. 17 is an explanatory diagram illustrating a process the capture target identification program according to the first embodiment of the invention performs to estimate a user's capturing position based on positional relationship between facilities.

FIG. 17 is an explanatory diagram illustrating a process the capture target identification program 307 according to the first embodiment of the invention performs to estimate a user's capturing position based on positional relationship between facilities.

As illustrated in FIG. 17, one captured image 1700 contains more than one facility such as facilities c1701 and d1702. Using the positional relationship between these facilities, the capture target identification program 307 may perform a process at step 1205 of identifying a user's capturing position 1703 capable of capturing the positional relationship between the facilities c1701 and d1702.

For example, the capture target identification program 307 may identify an estimated capture position for each of the facilities c1701 and d1702 using the method as described with reference to FIG. 14. The estimated capture positions for the two facilities may overlap each other and at least part of the overlapping range may be contained in the user position information error range 1400. In such a case, the facilities c1701 and d1702 may be captured in the same image. The capture target identification program 307 keeps these facilities as candidates. Conversely, the estimated capture positions for the two facilities may not overlap each other or no part of the overlapping range may be contained, in the user position information error range 1400. In such a case, the capture target identification program 307 assumes that the facilities c1701 and d1702 cannot be captured in the same image; namely, the two facilities contained in the captured image are not the set of the facilities c1701 and d1702. The capture target identification program 307 may exclude at least one of the facilities c1701 and d1702 as a candidate.

As described above, the first embodiment of the invention is applicable to a system that automatically provides information about a captured target facility to support the patrol and the inspection as maintenance tasks for many facilities such as utility poles densely distributed over a wide range in the power distribution facility. In such a system, the embodiment can automatically and highly precisely identify a target in consideration of a measurement error in the positioning information using the position information, the orientation information, and the captured image acquired by the mobile terminal having the capturing function and the positioning function. Using the identified target, the embodiment can automatically provide information about the captured target facility during the patrol or inspection on utility poles in the power distribution facility and thereby improve the patrol or inspection efficiency. The embodiment can automatically associate the facility ID with the captured facility image and therefore efficiently store facility images.

Second Embodiment

The second embodiment describes an example of the patrol support system having a system configuration and processes different from those of the first embodiment. According to the first embodiment, the mobile information terminal 101 transmits necessary information to the server system 100. The server system 100 identifies the captured facility and transmits the result to the mobile information terminal 101. According to the second embodiment, however, the mobile information terminal and the server system are not networked. The user connects the mobile information terminal to the client PC. On the day of the patrol or inspection, the user downloads data related to an area scheduled for the patrol or inspection and then goes to the patrol or inspection. During the inspection, the mobile information terminal internally identifies a capture target facility. Upon completion of the patrol or inspection for that day, the mobile information terminal uploads the result to the server system via the client PC.

Figure 18:
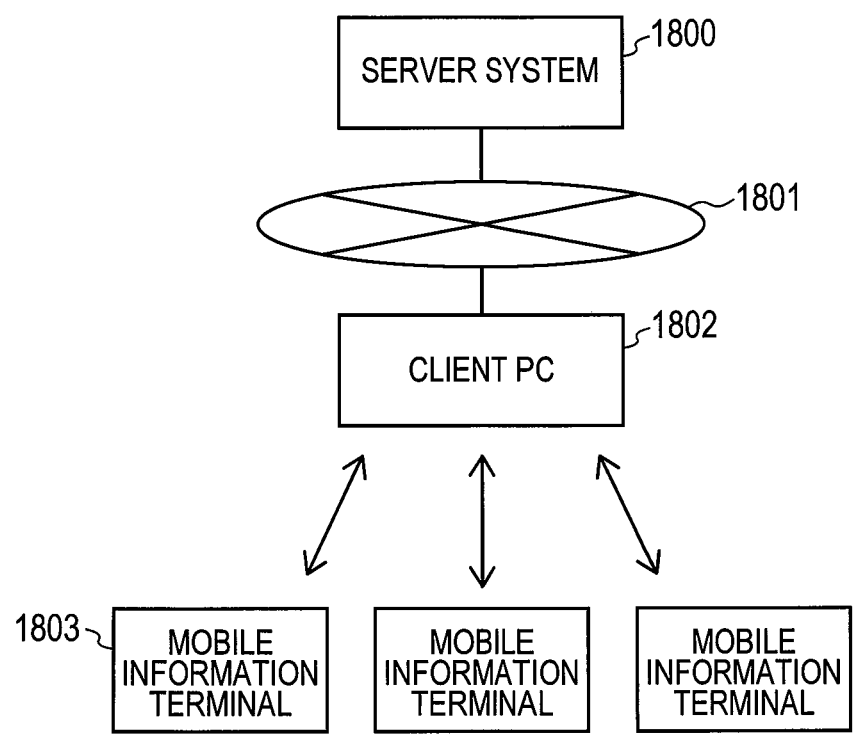
FIG. 18 is a block diagram illustrating an overall configuration of a patrol support system according to a second embodiment of the invention.

FIG. 18 is a block diagram illustrating an overall configuration of the patrol support system according to the second embodiment of the invention.

In the patrol support system according to the second embodiment, a server system 1800 and a client PC 1802 are connected via a wired or wireless network 1801. More than one mobile information terminal 1803 uploads and downloads data from the server system 1800 via the client PC 1802. According to the example in FIG. 18, three mobile information terminals 1803 are connected. The number of mobile information terminals 1803 to be connected is not limited thereto. Components of the system will be described.

Figure 19:
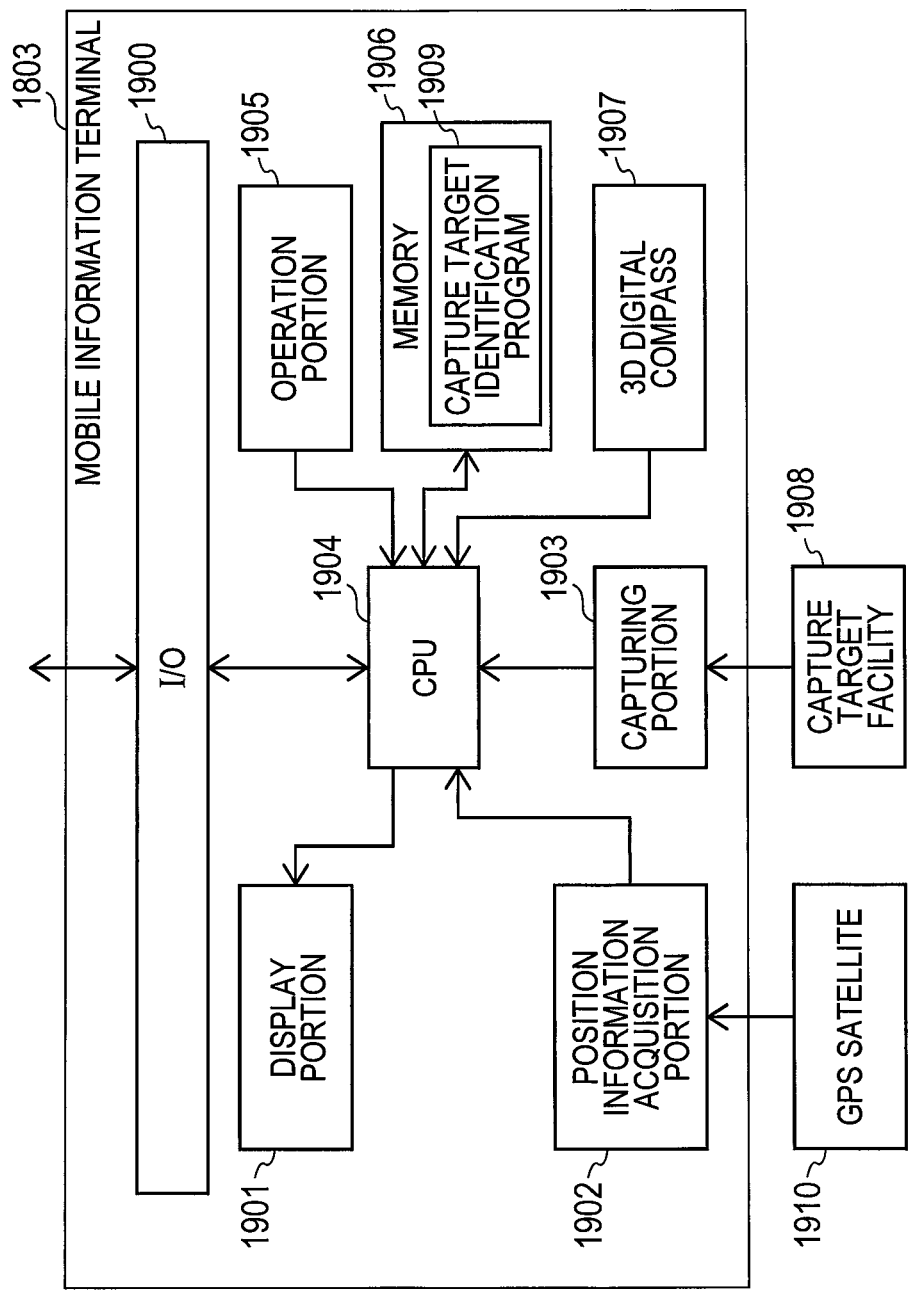
FIG. 19 is a block diagram illustrating a configuration of a mobile information terminal included in the patrol support system according to the second embodiment of the invention.

FIG. 19 is a block diagram illustrating a configuration of the mobile information terminal 1803 included in the patrol support system according to the second embodiment of the invention.

The mobile information terminal 1803 includes an I/O portion 1900, a display portion 1901, a position information acquisition portion 1902, a capturing portion 1903, a CPU 1904, an operation portion 1905, memory 1906, and a 3D digital compass 1907. The I/O portion 1900 enables connection to an external device such as a USB device. The display portion 1901 functions as a display. The position information acquisition portion 1902 acquires position information from a GPS satellite 1910. The capturing portion 1903 such as a digital still camera captures a capture target facility 1908. The CPU 1904 controls an overall process. The operation portion 1905 such as a button or a touch panel enables user's input operation. The memory 1906 is equivalent to a nonvolatile storage such as flash memory and stores image data and facility information. The 3D digital compass 1907 acquires the orientation of the mobile information terminal 1803.

The CPU 1904 acquires position information from the position information acquisition portion 1902. The CPU 1904 acquires information such as a captured image and a capture situation from the capturing portion 1903. The CPU 1904 acquires information such as the capture orientation from the 3D digital compass 207. The CPU 1904 stores the acquired information in the memory 1906. The CPU 1904 allows the display portion 1901 to display an image supplied with the acquired information about the target facility. These processes will be described later.

Specifically, the mobile information terminal 1830 is equivalent to a mobile terminal such as a digital camera, a mobile telephone, or a PDA. The position information acquisition portion 1902 includes a reception circuit. The position information acquisition portion 1902 receives a radio wave from the GPS satellite 1910 and measures a distance from the received radio wave. The position information acquisition portion 1902 thereby acquires position information such as the latitude and the longitude indicating the position of the mobile information terminal. The memory 1906 stores a capture target identification program 1909 to identify a capture target facility. The CPU 1904 reads the capture target identification program 1909 from the memory and performs it.

The memory 1906 also stores error information (not shown). The error information is similar to that stored in the memory 306 according to the first embodiment. The error information contains an error in the position information acquired by the position information acquisition portion 1902, an error in the orientation information acquired by the 3D digital compass 1907, and an error in the distance information about the distance to the capture target facility 208.

Figure 20:
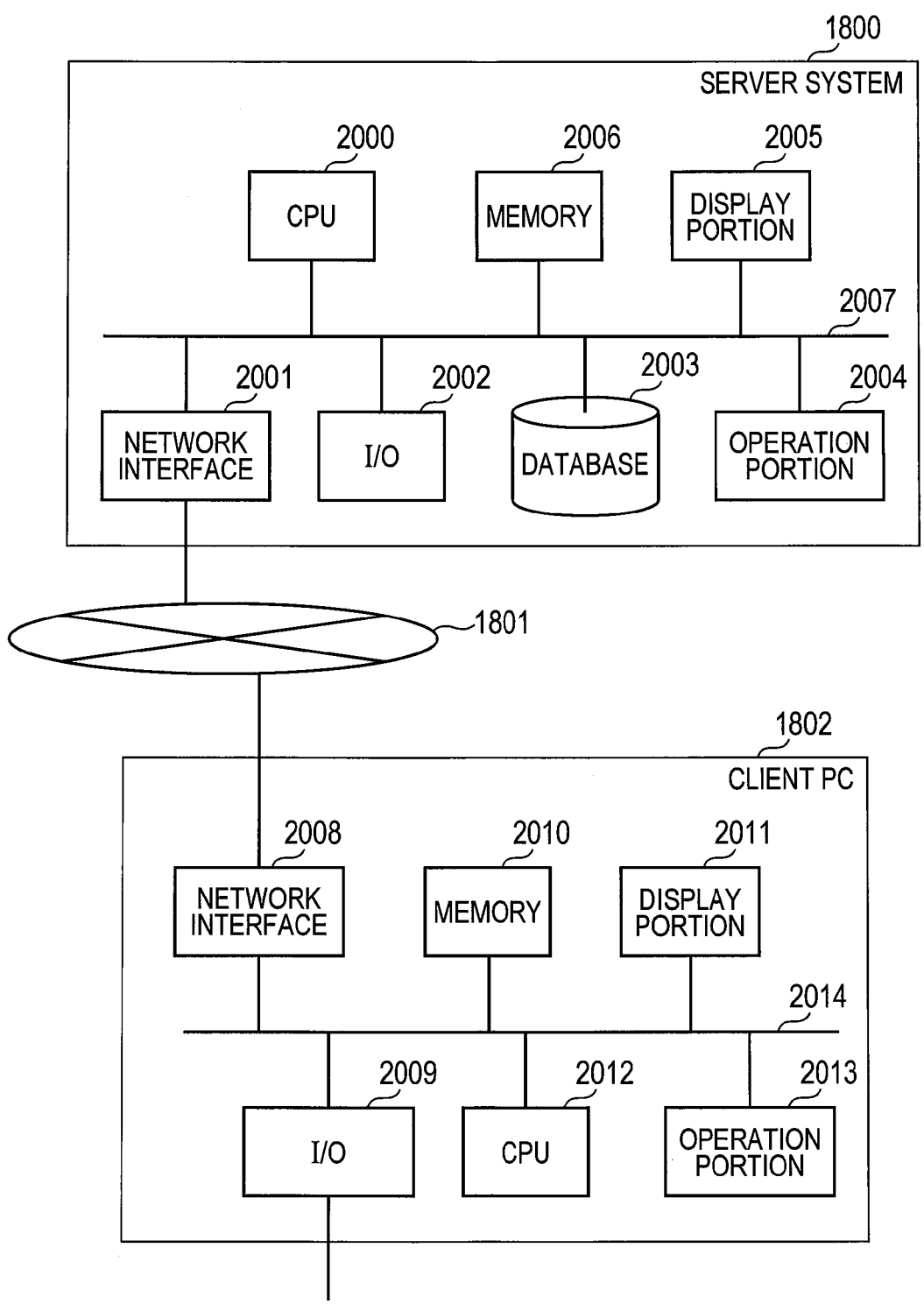
FIG. 20 is a block diagram illustrating a configuration of a server system and a client PC included in the patrol support system according to the second embodiment of the invention.

FIG. 20 is a block diagram illustrating a configuration of the server system 1800 and the client PC 1802 included in the patrol support system according to the second embodiment of the invention.

The server system 1800 includes a CPU 2000, a network interface 2001, an input/output (I/O) portion 2002, a database 2003, an operation portion 2004, a display portion 2005, memory 2006, and a data bus 2007. The CPU 2000 controls the whole of the server system 1800. The I/O portion 2002 enables connection to an external device such as a USB device. The database 2003 stores information about facilities, map information, and facility images. The operation portion 2004 such as a keyboard and a mouse enables user input operation. The display portion 2005 displays a process result and a log. The memory 2006 is equivalent to a nonvolatile storage. The data bus 2007 connects the components 2000 through 2006 with each other. The database 2003 may be configured on a storage device such as a hard disk drive.

The client PC 1802 includes a CPU 2012, a network interface 2008, an I/O portion 2009, an operation portion 2013, a display portion 2011, memory 2010, and a data bus 2014. The CPU 2000 controls the whole of the client PC 1802. The I/O portion 2009 enables connection to an external device such as a USB device. The operation portion 2013 such as a keyboard and a mouse enables user input operation. The display portion 2011 displays a process result and a log. The memory 2010 is equivalent to a nonvolatile storage. The data bus 2014 connects the components 2008 through 2013 with each other. The server system 1800 and the client PC 1802 are connected via the wired or wireless network 1801 and exchange data with each other via the network 1801.

According to the embodiment, the mobile information terminal 1803 is not connected to the server system 1800 via the network 1801. The user connects the mobile information terminal 1803 to the client PC 1802. On the day of the patrol or inspection, the user downloads data related to an area scheduled for the patrol or inspection and then goes to the patrol or inspection. During the inspection, the user captures the capture target facility 1908 using the capturing portion 1903. At the same time, the position information acquisition portion 1902 acquires the position information from the GPS satellite 1910. The 3D digital compass 1907 acquires the capture orientation. Using these pieces of information, the CPU 1904 performs the capture target identification program 1909 in the memory 1906 to identify the captured facility and display information about the captured facility on the display portion 1901. Upon completion of the patrol or inspection for that day, the mobile information terminal 1803 uploads the result to the server system 1800 via the client PC. The server system 1800 stores the captured image associated with the facility ID in the database 2003. The process will be described later in detail. Some contents of the second embodiment such as the configuration of the database 2003 are equal to those of the first embodiment and a description is omitted for simplicity.

The following describes an overall process in the patrol support system according to the embodiment having the above-mentioned configuration.

Figure 21:
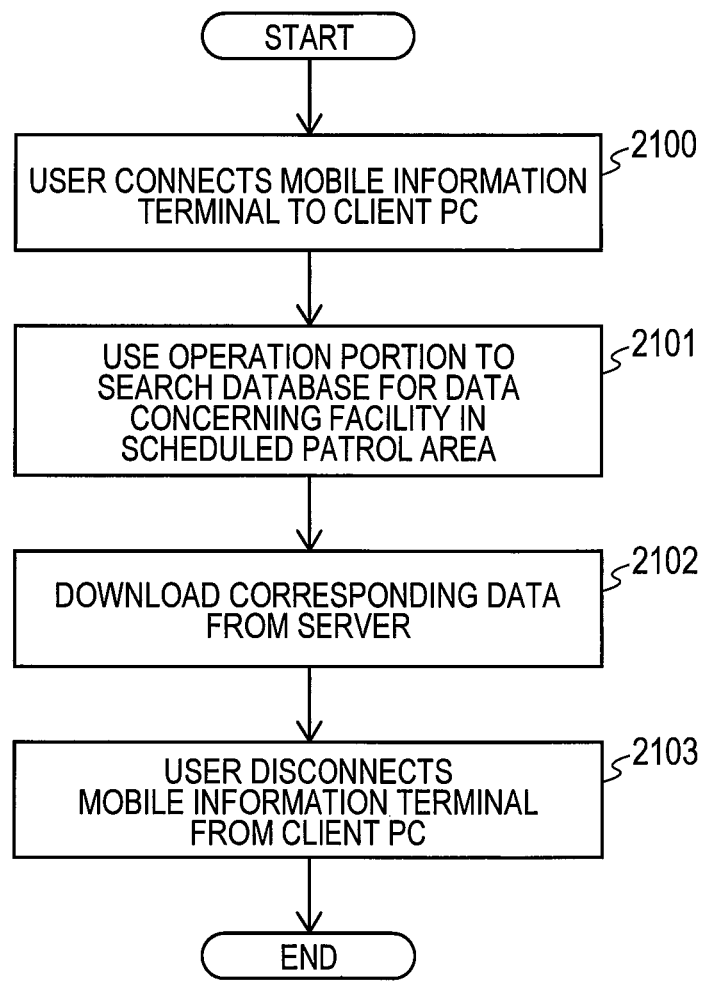
FIG. 21 is a flowchart illustrating a process for a user of the patrol support system according to the second embodiment of the invention to download related data before patrol or inspection.

With reference to FIG. 21, the following describes a process for the user (patroller) to download related data using the server system 1800 and the client PC 1802 before going to the patrol or inspection.

FIG. 21 is a flowchart illustrating a process for a user of the patrol support system according to the second embodiment of the invention to download related data before patrol or inspection.

The user (patroller) connects the I/O portion 2009 of the client PC 1802 with the I/O portion 1900 of the mobile information terminal 1803 using a connection means such as a USB cable (step 2100). This is just an example. There may be other methods of using an external storage medium such as flash memory to exchange data, for example.

The user operates the operation portion 2013 of the client PC 1802 to access the server system 1800 via the network 1801 and searches the database 2003 for data concerning a facility in the scheduled patrol area for that day (step 2101). The data concerning a facility in the scheduled patrol area includes the facility situation data 400 stored in the database 2003, the log data 402, and the peripheral map data 403.

The user downloads the data searched at step 2101 from the database in the server system 1800 to the client PC 1802 via the network 1801. The data is temporarily stored in the memory 2010 of the client PC 1802. The user stores the data in the memory 1906 of the mobile information terminal 1803 via the I/O portion 2009 of the client PC 1802 and the I/O portion 1900 of the mobile information terminal 1803 (step 2101).

When step 2102 is complete, the user disconnects the mobile information terminal 1803 from the client PC 1802.

The above-mentioned process flow allows the mobile information terminal 1803 to download the data concerning the facility to be patrolled for that day. The user carries the mobile information terminal and goes to the patrol or inspection.

Figure 22:
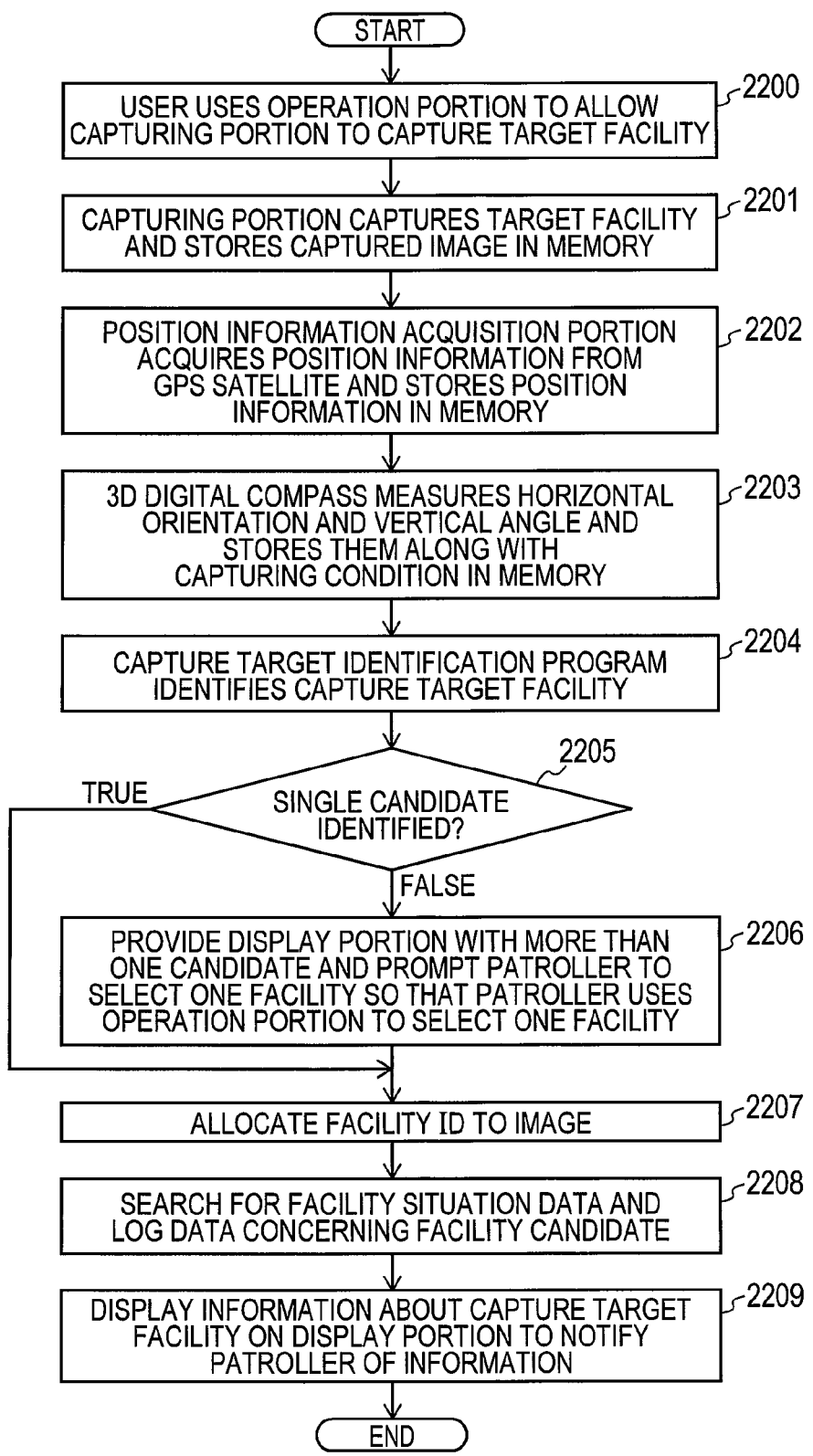
FIG. 22 is a flowchart illustrating a process the mobile information terminal according to the second embodiment of the invention performs.

With reference to FIG. 22, the following describes a process on the mobile information terminal 1803 during the patrol.

FIG. 22 is a flowchart illustrating a process the mobile information terminal 1803 according to the second embodiment of the invention performs.

The user (patroller) on the patrol or inspection operates the operation portion 1905 of the mobile information terminal 1803 near a capture target facility to allow the capturing portion 1903 to capture the capture target facility 1908 (step 2200).

The capturing portion 1903 receives the capture instruction from the user and captures the capture target facility 1908. The capturing portion 1903 acquires the captured image and capturing conditions (the zoom ratio of the camera, the focal length thereof, the capturing element size, and the capture date) and stores them in the memory 1906 (step 2201).

In response to the capture instruction from the user, the position information acquisition portion 1902 acquires position information about the mobile information terminal 1803 from the GPS satellite 1910 and stores the position information in the memory 1906 (step 2202). Specifically, the position information acquisition portion 1902 receives a radio wave from the GPS satellite 1910 and measures a distance based on the received radio wave to calculate the latitude and the longitude corresponding to the mobile information terminal 1803.

In response to the capture instruction from the user, the 3D digital compass 1907 measures a horizontal orientation and a vertical angle and stores them in the memory 1906 (step 2203).

The CPU 1904 performs the capture target identification program 1909 stored in the memory 1906. The capture target identification program 1909 identifies the captured facility using data stored in the memory 1906 (step 2204). The data stored in the memory 1906 includes the captured image, the position information of the mobile information terminal, the capture orientation, the capturing conditions, and the data downloaded from the server system. The process content of the capture target identification program 1909 is similar to that of the capture target identification program 307 described in the first embodiment and a description is omitted for simplicity.

The mobile information terminal 1803 checks a processing result of the capture target identification program 1909 to determine whether a single target facility can be identified (step 2205).

A processing result at step 2205 may denote that more than one facility candidate is available as a capture target. In this case, the mobile information terminal 1803 provides the display portion 1901 with more than one candidate as well as the peripheral map and prompts the user (patroller) to select one of the facilities as the candidates. The user operates the operation portion 1905 to select one of the facilities (step 2206). The display method of the display portion 1901 is similar to that of the display portion 201 according to the first embodiment and a description is omitted for simplicity (see FIG. 10).

Suppose a case where a single target facility can be identified as a result of step 2205 or one of the facility candidates is selected at step 2206. In such a case, the mobile information terminal 1803 re-stores the captured image associated with the identified facility ID in the memory 1906 (step 2207).

The mobile information terminal 1803 searches the memory 1906 for facility situation data and log data related to the identified capture target facility (step 2208).

The mobile information terminal 1803 provides the user (patroller) with the retrieved data by displaying it on the display portion 1901 (step 2209). A display example is similar to that described in the first embodiment and a description is omitted for simplicity (see FIG. 11).

Figure 23:
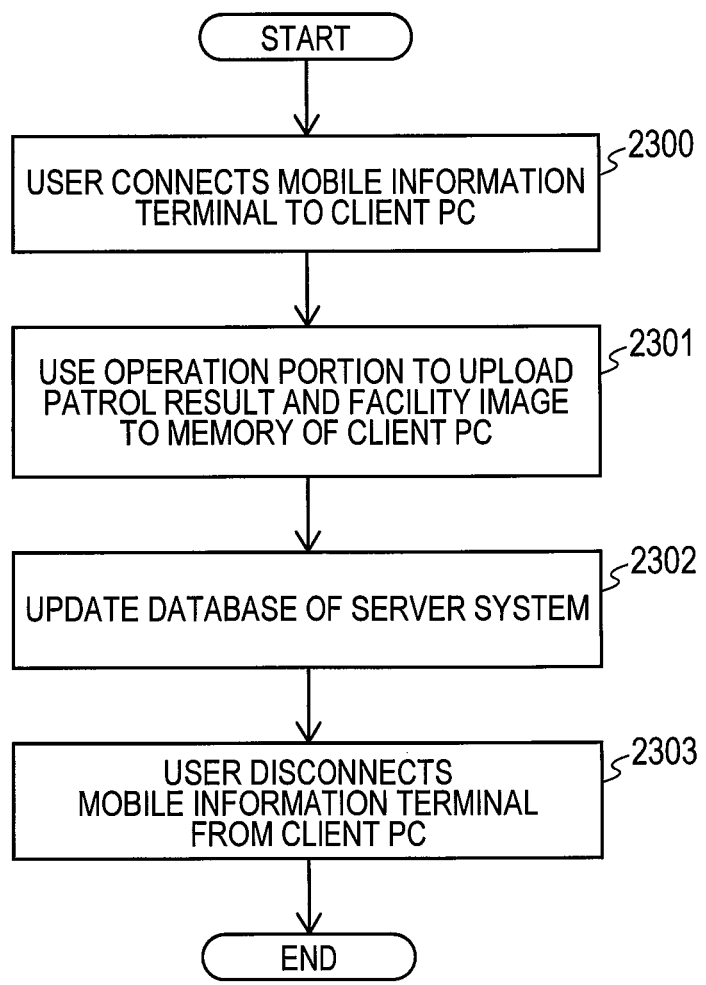
FIG. 23 is a flowchart illustrating a process for a user of the patrol support system according to the second embodiment of the invention to upload related data after patrol or inspection.

With reference to FIG. 23, the following describes a process for the user (patroller) to upload related data using the server system 1800 and the client PC 1802 after completion of the patrol or inspection for that day.

FIG. 23 is a flowchart illustrating a process for a user of the patrol support system according to the second embodiment of the invention to upload related data after patrol or inspection.

The user (patroller) connects the I/O portion 2009 of the client PC 1802 with the I/O portion 1900 of the mobile information terminal 1803 using a connection means such as a USB cable (step 2300). This is just an example. There may be other methods of using an external storage medium such as flash memory to exchange data, for example.

The memory 1906 of the mobile information terminal stores the patrol result for the day and the captured facility image. The user operates the operation portion 2013 of the client PC 1802 to store the patrol result and the captured facility image in the memory 2010 of the client PC 1802 via the I/O portion 2009 of the client PC 1802 and the I/O portion 1900 of the mobile information terminal 1803 (step 2301).

The client PC 1802 transmits the data stored in the memory 2010 to the server system 1800 via the wired or wireless network 1801. The server system 1800 temporarily stores the data received from the client PC 1802 in the memory 2006. The server system 1800 then distributes the data in the memory 2006 to each data in the database 2003 to update it (step 2302). For example, the server system 1800 overwrites the most recent patrol date 506 of the facility situation data 400 concerning the facility subjected to the most recent patrol or inspection. The server system 1800 stores the most recently captured facility image in the record having the corresponding facility ID in the facility image data 401.

Upon completion of step 2302, the user disconnects the mobile information terminal 1803 from the client PC 1802 (step 2303).

According to the second embodiment of the invention as described above, the mobile information terminal 1803 and the server system 1800 are not connected via the network 1801. The user connects the mobile information terminal 1803 to the client PC 1802, downloads data related to an area scheduled for the patrol or inspection on the day of the patrol or inspection, and then goes to the patrol or inspection. During the inspection, the mobile information terminal 1803 internally identifies a capture target facility. Upon completion of the patrol or inspection for that day, the mobile information terminal 1803 uploads the result to the server system via the client PC.

The second embodiment of the invention is applicable to a system that automatically provides information about a captured target facility to support the patrol and the inspection as maintenance tasks for many facilities such as utility poles densely distributed over a wide range in the power distribution facility. In such a system, the embodiment can automatically and highly precisely identify a target in consideration of a measurement error in the positioning information using the position information, the orientation information, and the captured image acquired by the mobile terminal having the capturing function and the positioning function. Using the identified target, the embodiment can automatically provide information about the captured target facility during the patrol or inspection on utility poles in the power distribution facility and thereby improve the patrol or inspection efficiency. The embodiment can automatically associate the facility ID with the captured facility image and therefore efficiently store facility images.

Third Embodiment

The embodiment describes an example of a shop information provision system. Suppose a user captures a shop in a shopping district using a mobile information terminal having the capturing function and the positioning function. The shop information provision system automatically identifies the captured shop and automatically provides the user with information about the identified shop.

An overall system configuration of the shop information provision system according to the embodiment is similar to that of the block diagram in FIG. 1 illustrating the overall configuration of the patrol support system according to the first embodiment and a description is omitted for simplicity. The following describes components of the system.

Figure 24:
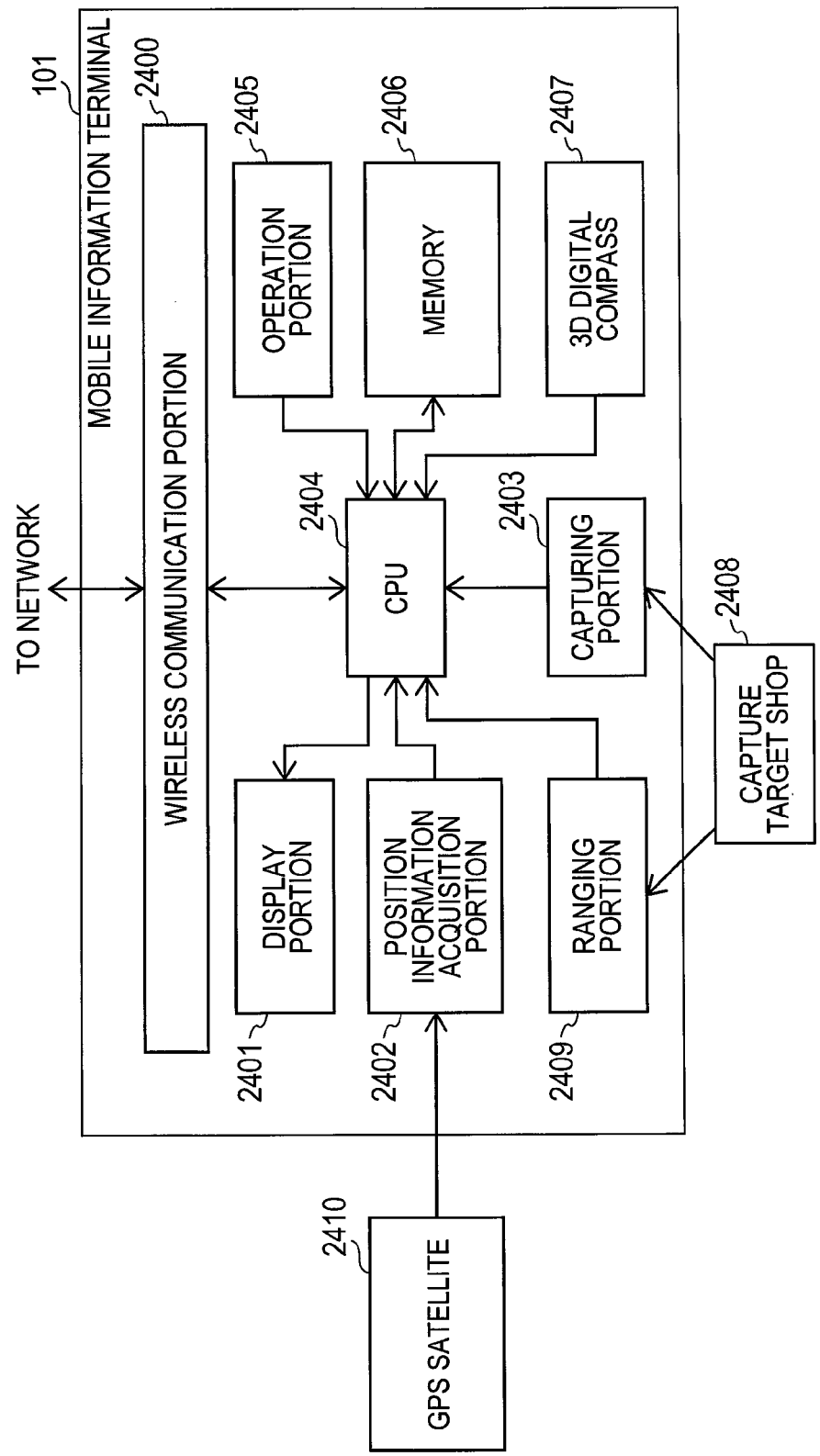
FIG. 24 is a block diagram illustrating a configuration of a mobile information terminal in a shop information provision system according to a third embodiment of the invention.

FIG. 24 is a block diagram illustrating a configuration of the mobile information terminal 101 in the shop information provision system according to the third embodiment of the invention.

The first and the second embodiments capture a utility pole in the power distribution facility, for example, an object whose shape is previously known. These embodiments relatively easily extract the facility from the captured image and calculate the facility height. The facility situation data manages the height information for each facility. However, the third embodiment captures a shop in a shopping district, for example. The extraction process may be complicate because shops are variously shaped. It is unlikely to manage the height information for each shop. If the height information for each shop is managed, the system may calculate a height from the captured image and calculate a distance to the capture target using the height similarly to the first and the second embodiments.

The third embodiment presupposes that the height information for each shop is not managed. The mobile information terminal 101 according to the embodiment includes a ranging portion as a means to calculate a distance to a capture target. The ranging portion measures a distance between the capture target and the mobile information terminal 101. The ranging portion is equivalent to an ultrasonic range sensor or an infrared range sensor, for example. The ultrasonic range sensor calculates a distance by transmitting a sound wave and measuring the time until the sound wave returns after reflecting off a target. The infrared range sensor does the same using infrared rays.

The mobile information terminal 101 includes a wireless communication portion 2400, a display portion 2401, a position information acquisition portion 2402, a capturing portion 2403, a CPU 2404, an operation portion 2405, memory 2406, a 3D digital compass 2407, and a ranging portion 2409. The display portion 2401 is equivalent to a display that provides a user with a captured image and facility information. The position information acquisition portion 2402 acquires position information from a GPS satellite 2410. The capturing portion 2403 is equivalent to a digital still camera that captures a capture target shop 2408. The CPU 2404 controls an overall process. The operation portion 2405 is equivalent to a button or a touch panel for user input operation. The memory 2406 is equivalent to a nonvolatile storage such as flash memory that stores image data and facility information. The 3D digital compass 2407 acquires the orientation of the mobile information terminal 101.

The position information acquisition portion 2402 includes a reception circuit. The position information acquisition portion 2402 receives a radio wave from the GPS satellite 2410 and measures a distance from the received radio wave. The position information acquisition portion 2402 thereby acquires position information such as the latitude and the longitude indicating the position of the mobile information terminal.

The CPU 2404 acquires position information from the position information acquisition portion 2402. The CPU 2404 acquires information such as a captured image from the capturing portion 2403. The CPU 2404 acquires information such as the capture orientation from the 3D digital compass 2407. The CPU 2404 acquires information such as an object distance from the ranging portion 2409. The CPU 2404 stores the acquired information in the memory 2406. The CPU 2404 transmits the information to the server system 100 via the wireless communication portion 2400 and the network 102 connected to it. The CPU 2404 acquires information about a target shop from the server system 100 via the wireless communication portion 2400 and the network 102 connected to it. The CPU 2404 stores the acquired information in the memory 2406. The CPU 2404 allows the display portion 2401 to display an image supplied with the acquired information about the target shop. These processes will be described later.

An internal configuration of the shop information provision system according to the embodiment is similar to that of the block diagram in FIG. 3 illustrating the server system configuration according to the first embodiment and a description is omitted for simplicity. The error information maintained in the server system 100 according to the third embodiment contains error information about an object distance acquired by the ranging portion 2409. An internal configuration of the database 303 according to the third embodiment differs from that of the database 303 according to the first embodiment and the database 2003 according to the second embodiment.

Figure 25:
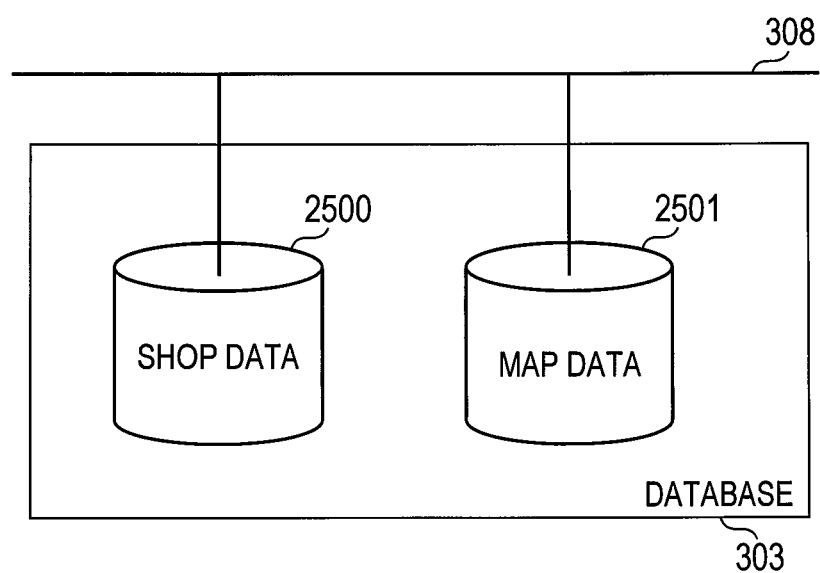
FIG. 25 is a block diagram illustrating a configuration of a database according to the third embodiment of the invention.

FIG. 25 is a block diagram illustrating a configuration of the database 303 according to the third embodiment of the invention. The database 303 includes shop data 2500 and map data 2501.

FIG. 26 is an explanatory diagram illustrating a configuration of the shop data 2500 contained in the database 303 according to the third embodiment of the invention.

The shop data 2500 includes a shop ID2600, shop position information 2601, a shop name 2604, a shop type 2605, a comment 2606, and shop URL 2607. The shop data 2500 is not limited thereto and may include shop information that can be provided for users. The shop position information 2601 includes latitude 2602 and longitude 2603.

Data 2608, 2609, and 2610 represent examples of the stored shop data. For example, the data 2608 stores information about a shop distinguished by value 234 for the shop ID 2600. The shop with shop ID "234" is positioned at latitude 35.6579 and longitude 139.7443. The shop name is "AAA Store." The shop handles miscellaneous goods. The shop offers a 5% discount for all items on December. The shop's web site is identified by its URL, http://www .... The data 2609 and 2610 also contain information about corresponding shops.

Like ordinary GIS databases, the map data 2501 stores position information about roads and buildings and a detailed description is omitted for simplicity.

The following describes processes for the entire shop information provision system according to the embodiment having the above-mentioned configuration.

Figure 27:
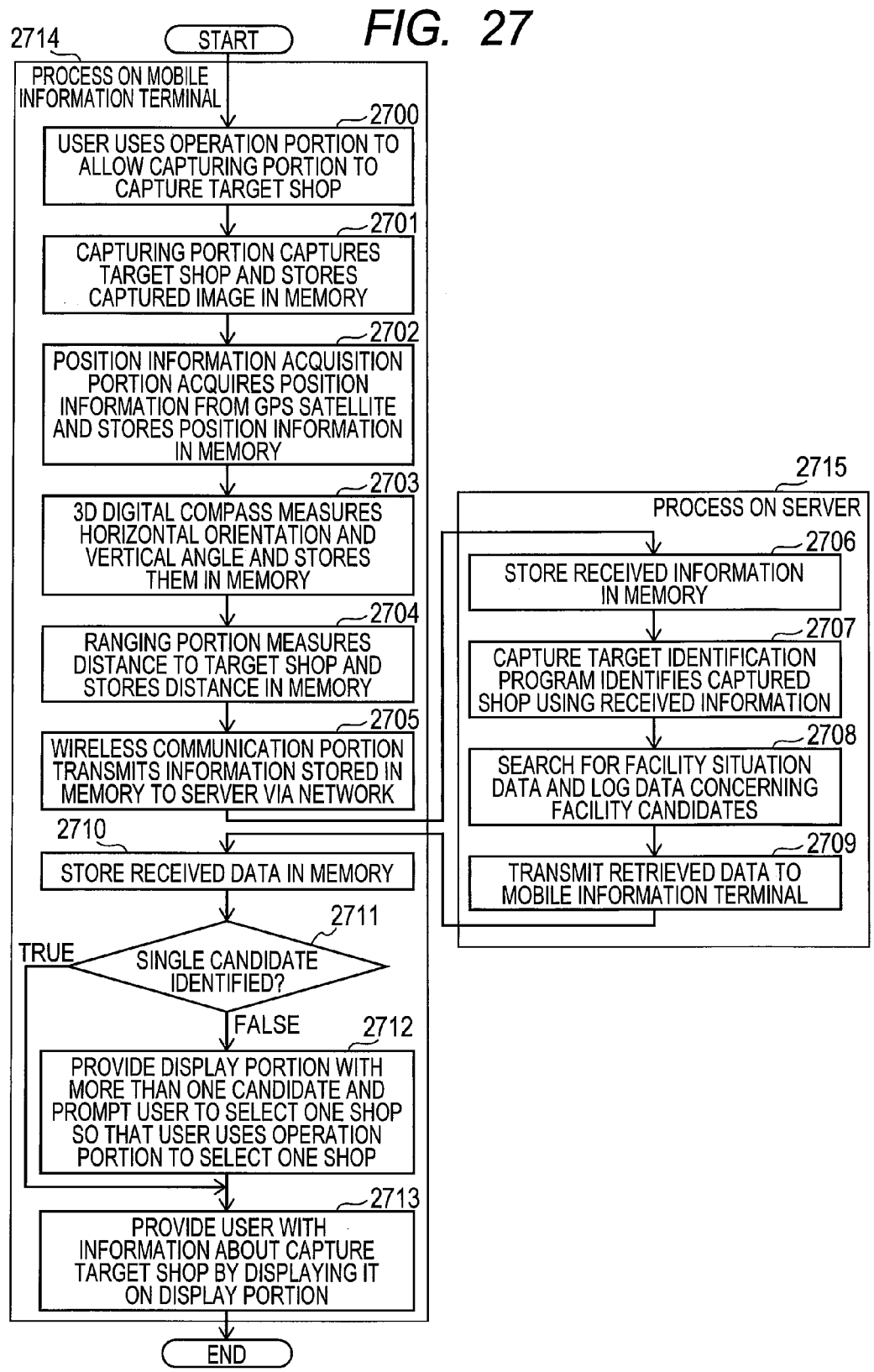
FIG. 27 is a flowchart illustrating processes performed in the shop information provision system according to a third embodiment of the invention.

FIG. 27 is a flowchart illustrating processes performed in the shop information provision system according to the third embodiment of the invention.

The processes will be described in order. A process 2714 for the mobile information terminal 101 according to the embodiment includes steps 2700, 2701, 2702, 2703, 2704, 2705, 2710, 2711, 2712, and 2713. A process 2715 for the server system 100 according to the embodiment includes steps 2706, 2707, 2708, and 2709. The CPU 2404 performs and controls the process for the mobile information terminal 101. The CPU 300 performs and controls the process for the server system.

First, the mobile information terminal 101 starts steps 2700, 2701, 2702, 2703, 2704, and 2705.

The user carries the mobile information terminal 101 and operates its operation portion 2405 near a capture target shop and issues an instruction to the capturing portion 2403 to capture the capture target shop 2408 (step 2700).

The capturing portion 2403 receives the capture instruction from the user, captures the capture target shop 2408, acquires a captured image, and stores it in the memory 2406 (step 2701).

In response to the capture instruction from the user, the position information acquisition portion 2402 acquires position information about the mobile information terminal 101 from the GPS satellite 2410 and stores the position information in the memory 2406 (step 2702). Specifically, the position information acquisition portion 2402 receives a radio wave from the GPS satellite 2410 and measures a distance based on the received radio wave to calculate the latitude and the longitude corresponding to the mobile information terminal 101.

In response to the capture instruction from the user, the 3D digital compass 2407 measures a horizontal orientation and a vertical angle and stores them in the memory 2406 (step 2703).

In response to the capture instruction from the user, the ranging portion 2409 measures a distance between the mobile information terminal 101 and the capture target shop and stores the distance in the memory 2406 (step 2704). For example, the ranging portion 2409 measures the distance using an ultrasonic range sensor or an infrared range sensor. The ultrasonic range sensor calculates a distance by transmitting a sound wave and measuring the time until the sound wave returns after reflecting off a target. The infrared range sensor does the same using infrared rays.

The mobile information terminal 101 transmits the information stored in the memory at steps 2700 through 2704 to the server system 100 from the wireless communication portion 2400 via the network 102 (step 2705). The information stored in the memory 2406 contains the captured image, the position information about the mobile information terminal, the capture orientation, and the distance to the capture target shop.

Control proceeds to steps 2706, 2707, 2708, and 2709 on the server system 100.

The server system 100 temporarily stores the information received from the mobile information terminal 101 in the memory 306 (step 2706). The information received from the mobile information terminal 101 contains the captured image, the position information about the mobile information terminal, the capture orientation, and the distance to the capture target shop.

The CPU 300 performs the capture target identification program 307 stored in the memory 306. The capture target identification program 307 identifies the captured shop using the information stored in the memory 306 and data stored in the database 303 (step 2707). The information stored in the memory 306 contains the captured image, the position information about the mobile information terminal, the capture orientation, and the distance to the capture target shop. According to the embodiment, the capture target identification program 307 identifies a single target shop or provides several candidates using the information stored in the memory 306 and the data stored in the database 303. If a single target shop cannot be found, the capture target identification program 307 provides the user with several candidates and prompts the user to select one to finally identify a single shop. The process of the capture target identification program 307 according to the embodiment will be described later in detail.

The server system 100 searches the shop data 2500 for data concerning the identified shop or several shop candidates (step 2708). If the single shop is identified, the server system 100 searches for only data concerning the shop. If several candidates are provided, the server system 100 searches for data concerning the target shop candidates.

The server system 100 transmits the shop candidate data retrieved at step 2708 to the mobile information terminal 101 via the network interface 301 and the network 102 (step 2709).

The mobile information terminal 101 then performs steps 2710, 2711, 2712, and 2713.

The wireless communication portion 2400 of the mobile information terminal 101 receives the shop candidate data transmitted from the server system 100 via the network 102. The wireless communication portion 2400 stores the received data in the memory 2406 (step 2710).

The mobile information terminal 101 determines whether a single shop candidate is identified as a capture target (step 2711). Specifically, a single shop candidate can be identified if the mobile information terminal 101 receives the data concerning only the single shop from the server system 100. Conversely, the mobile information terminal 101 can assume several shop candidates available if the received data concerns more than one shop.

A processing result at step 2711 may denote that more than one shop candidate is available as a capture target. In this case, the mobile information terminal 101 provides the display portion 2401 with more than one candidate as well as the peripheral map and prompts the user to select one of the shops as the candidates. The user operates the operation portion 2405 to select one of the shops (step 2712). A display example is similar to the first and second embodiments except that a shop or a building is displayed. Therefore, a detailed description is omitted for simplicity (see FIG. 10). While the balloon message in FIG. 10 provides the facility ID, the third embodiment may favorably provide the shop name and the shop type. This is because the embodiment concerns shops as targets and the user can hardly understand the shop ID if provided.

A processing result at step 2711 may denote that the single capture target shop is identified. Alternatively, the process at step 2712 may be performed. In such a case, the single shop is identified. The mobile information terminal 101 reads data concerning the identified capture target shop from the memory 2406 and provides the user with the data by displaying it on the display portion 2401 (step 2713).

Figure 28:
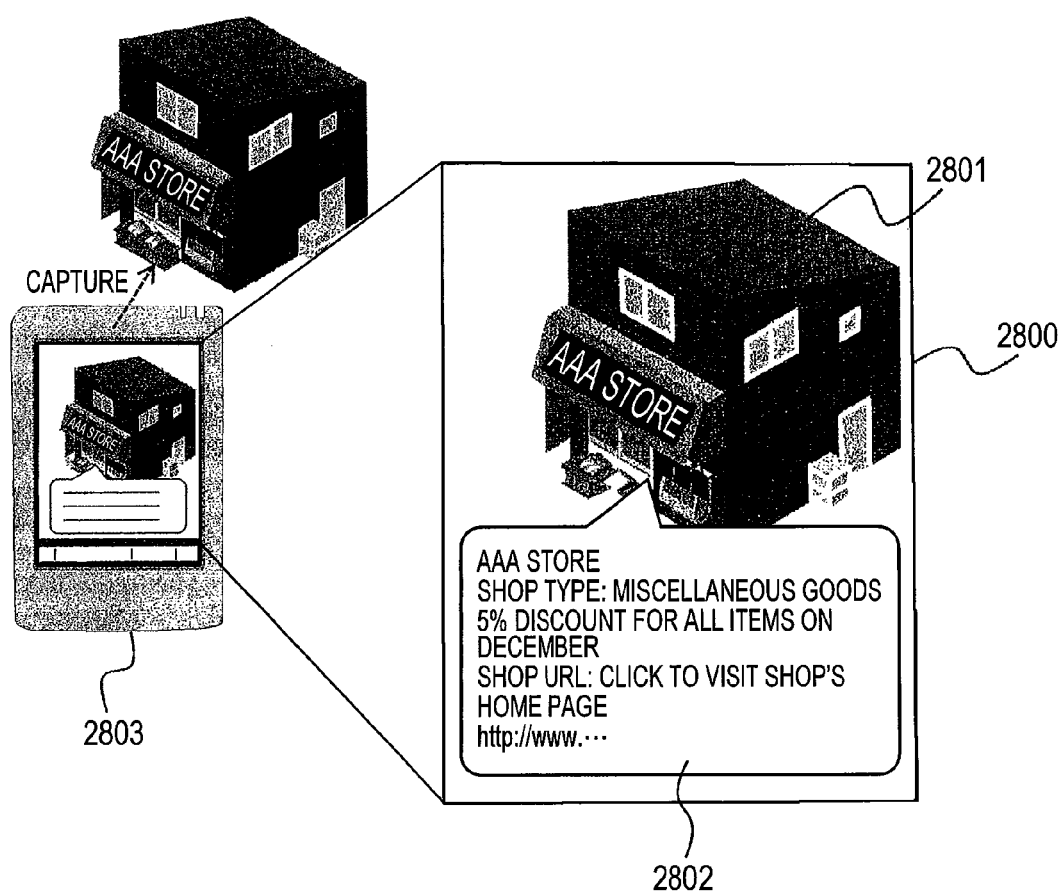
FIG. 28 illustrates data about a capture target shop displayed on a display portion of the mobile information terminal according to the third embodiment of the invention.

FIG. 28 illustrates data about a capture target shop displayed on the display portion 2401 of the mobile information terminal 101 according to the third embodiment of the invention.

A display portion 2800 of a mobile information terminal 2803 displays an image 2801 of the captured capture target shop and data 2802 concerning the capture target shop. In FIG. 28, the identified shop is distinguished by shop ID 234 of the shop data in FIG. 26. The data 2802 concerning the shop distinguished by shop ID 234 is superimposed on captured image 2801 of the identified shop.

For example, the data 2802 provides the shop name 2604, the shop type 2605, the comment 2606, and the URL 2607 for the shop's web site, namely, the information about the data 2603 concerning shop ID 234 of the shop data 2500 in FIG. 26. For example, the displayed URL may be linked so that clicking the URL displays the corresponding web site.

The user just needs to capture a target shop in the shopping district using the mobile information terminal. The system automatically identifies the captured shop, retrieves data concerning the shop, and displays the data on the mobile information terminal. The user can reference the displayed information. The system can assist the user in selecting shops. According to the example in FIG. 28, data concerning the shop is superimposed on the captured image. The embodiment is not limited thereto. Various methods are available. For example, the display portion 2401 may provide a table of data about the shop instead of images.

FIG. 29 is a flowchart illustrating a process performed in the shop information provision system according to the third embodiment of the invention to identify a capture target shop. Specifically, the following describes in detail the process performed at step 2707 of the flowchart in FIG. 27.

The process in FIG. 29 starts when the CPU 300 performs the capture target identification program 307 stored in the memory 306. The process content is similar to that of the first and second embodiments (see FIG. 12). According to the third embodiment, the ranging portion 2409 mounted, on the mobile information terminal finds a distance to the capture target shop. The step to find the distance is omitted. The measured distance data is used.

The capture target identification program 307 uses the position information about the user, namely, the position information about the mobile information terminal 101 and the capture orientation stored in the memory 306 to specify a range including their measurement errors. The capture target identification program 307 uses the shop position information 2601 stored in the shop data 2500 to identify an available range of captured shops containing a target shop (step 3900). The capture target identification program 307 performs this process similarly to step 1200 in FIG. 12 (see FIG. 13).

The capture target identification program 307 assumes that the user used the mobile information terminal 101 to capture the shops contained in the available range of captured shops containing a target shop. The capture target identification program 307 estimates the user capture position with reference to each shop contained in the available range of captured shops containing a target shop using distance data (measured by the ranging portion 2409) to the target shop (step 2901). The process is performed similarly to step 1202 in FIG. 12 (see FIG. 14) except that the process uses the distance data measured by the ranging portion 2409 instead of the distance calculated using the information about the target shop height.

The capture target identification program 307 narrows shop candidates by verifying whether the capture position estimated for each shop is contained in the user position information error range (step 2902). This process is performed similarly to step 1203 in FIG. 12.

As a result of narrowing at step 2902, the capture target identification program 307 determines whether a single candidate is identified (step 2903).

When determining at step 2903 that more than one shop candidate remains, the capture target identification program 307 further narrows the shop candidates by using map data and verifying validity of the user position estimated from the geographical conditions (step 2904). This process is performed similarly to step 1205 in FIG. 12 (see FIGS. 16A and 16B).

One or more shops may result from the narrowing according to the above-mentioned steps. The capture target identification program 307 outputs the resulting shops as captured shop candidates (step 2905).

As described above, the user just needs to capture a target shop in the shopping district using the mobile information terminal. The shop information provision system according to the embodiment automatically and highly precisely identifies the captured shop in consideration of a positioning error. The shop information provision system retrieves data concerning the shop and supplies the data to the mobile information terminal. The shop information provision system allows the user to reference the information and provides the user with the reliable information.

While there have been described specific preferred embodiments of the present invention with reference to the accompanying drawings, it is to be distinctly understood that the present invention is not limited thereto but may include various modifications and equivalent configurations within the spirit and scope of the appended claims. For example, the invention is applicable to maintenance tasks such as patrol or inspection on many facilities such as utility poles densely distributed in the power distribution facility. The invention is also applicable to the purpose of automatically providing the user with information about a capture target while shopping or traveling.

What is claimed is:

1. A target identification system comprising:
    a computer connected to a network; and
    a terminal apparatus connected to the network,
    wherein the computer includes an interface connected to the network, a processor connected to the interface, and first and second non-transitory storage media connected to the processor;
    wherein the first non-transitory storage media stores position information about a plurality of targets;
    wherein the terminal apparatus includes:
    a camera that captures an image of the target;
    a position information acquisition portion that acquires information about a position to capture the image of the target;
    a compass that acquires information about an orientation to capture the image of the target; and
    a communication interface that transmits the image captured by the camera, position information acquired by the position information acquisition portion, and orientation information acquired by the compass to the computer via the network;
    wherein the second non-transitory storage media stores instructions that, when executed on the processor, cause the processor to:
    identify at least one first target candidate as a candidate for the captured target from the targets based on position information about the targets, information about the position to capture the image of the target, and information about the orientation to capture the image of the target;
    identify at least one second target candidate as a candidate for the captured target from the at least one first target candidate based on a distance from the terminal apparatus to the captured target; and
    transmit information about the second identified target candidate to the terminal apparatus, and
    wherein the terminal apparatus further includes a display portion that displays the information about the second identified target candidate.

2. The target identification system according to claim 1,
    wherein the first non-transitory storage media further stores error information indicative of error in a position acquired by the position information acquisition portion, error in the orientation acquired by the compass, and error in a distance from the terminal apparatus to the captured target, and
    wherein the second non-transitory storage media stores instructions that, when executed on the processor, further cause the processor to:
    identify an error range of the position to capture the image of the target and an error range of the orientation to capture the image of the target based on the error information and identifies the first target candidate equivalent to the target positioned in a union of error ranges of an orientation to capture the image of the target with reference to all points in the error range of the position to capture the image of the target;
    identify a range of the position to capture the at least one first candidate based on an error range of the distance from the terminal apparatus to the at least one first target candidate and the error range of the orientation to capture the image of the target, each error range being identified based on the error information when the target captured by the camera is assumed to be the at least one first target candidate; and
    identify the second target candidate when the error range of the position to capture the image of the target contains at least part of the range of the position to capture the first target candidate.

3. The target identification system according to claim 2,
    wherein the first non-transitory storage media further stores map information, and
    wherein the second non-transitory storage media stores instructions that, when executed on the processor, further cause the processor to:
    identify a range capable of capturing the first target candidate; and
    identify the second target candidate when the target captured by the camera is assumed to be the at least one first target candidate, a range of the position to capture the at least one first target candidate is thereby identified, and at least part of the range thereof is contained in a range of the position to capture the image of the target and a range capable of capturing the at least one first target candidate.

4. The target identification system according to claim 3,
    wherein the map information includes information about geographical features and building shapes, and
    wherein the second non-transitory storage media stores instructions that, when executed on the processor, further cause the processor to:

identify a range capable of viewing the at least one first target candidate as a range capable of capturing the at least one first target candidate based on the map information.

5. The target identification system according to claim 3, wherein the map information includes information indicating the range, and
wherein the second non-transitory storage media stores instructions that, when executed on the processor, further cause the processor to:
identify the range enabling a user of the terminal apparatus to enter as the range capable of capturing the first target candidate based on the map information.

6. The target identification system according to claim 2, wherein the second non-transitory storage media stores instructions that, when executed on the processor, further cause the processor to:
when the camera captures two targets in the image, assume two of a plurality of the first target candidates to be the two targets captured by the camera and thereby identifies a range of a position to capture each of the two of the first target candidates based on an error range of a distance from the terminal apparatus to each of the two of the first target candidates and based on an error range of an orientation to capture an image of each of the two of the first target candidates; and
assume the two of the first target candidates to be two second target candidates when at least part of ranges of positions to capture the two of the first target candidates overlap with each other and at least part of the overlap is contained in a range of positions to capture images of the two of the first target candidates.

7. The target identification system according to claim 1, wherein the first non-transitory storage media stores information about heights of the targets, and
wherein the second non-transitory storage media stores instructions that, when executed on the processor, further cause the processor to:
calculate a distance between the captured target and the terminal apparatus based on a height of the first target candidate and a height of a partial image of the target contained in the captured image.

8. The target identification system according to claim 1, wherein the terminal apparatus further includes a ranging portion that acquires information about the distance from the terminal apparatus to the captured target, and
wherein the communication portion transmits information about the distance acquired by the ranging portion to the computer via the network.

9. The target identification system according to claim 1, wherein the second non-transitory storage media stores instructions that, when executed on the processor, further cause the processor to:
when only one second target candidate is identified, store information to distinguish the second identified target candidate in association with the image captured by the capturing portion in the first non-transitory storage media; and
wherein, when two or more second target candidates are identified, the display portion displays information about the two or more second identified target candidates,
the terminal apparatus further includes an operation portion that enters information to select one of the two or more second identified target candidates, the communication portion transmits information to distinguish the selected one of the two or more target candidates to the computer via the network, and
wherein the second non-transitory storage media stores instructions that, when executed on the processor, further cause the processor to:
store information to distinguish the selected one of the two or more target candidates in association with the image captured by the camera in the first non-transitory storage media.

10. A target identification server comprising:
an interface connected to a network;
a processor connected to the interface; and
first and second non-transitory storage media connected to the processor,
wherein the first non-transitory storage media stores position information about a plurality of targets,
wherein the processor, via the interface, receives an image of a captured target, information about a position to capture the image of the captured target, and information about an orientation to capture the image of the captured target from a terminal apparatus;
wherein the second non-transitory storage media stores instructions that, when executed on the processor, cause the processor to:
identify at least one first target candidate as a candidate for the captured target from the targets based on position information about the targets, information about a position to capture the image of the target, and information about the orientation to capture the image of the target;
identify at least one second target candidate as a candidate for the captured target from the at least one first target candidate based on a distance from the terminal apparatus to the captured target; and
transmit information about the second identified target candidate to the terminal apparatus.

11. The target identification system according to claim 10, wherein the first non-transitory storage media further stores error information indicative of error in the position to capture the image of the target, error in the orientation to capture the image of the target, and error in the distance from the terminal apparatus to the captured target;
wherein the second non-transitory storage media stores instructions that, when executed on the processor, further cause the processor to:
identify an error range of the position to capture the image of the target and an error range of the orientation to capture the image of the target based on the error information and identifies the at least one first target candidate equivalent to the target positioned in a union of error ranges of the orientation to capture the image of the target with reference to all points in the error range of the position to capture the image of the target;
identify a range of the position to capture the at least one first candidate based on an error range of the distance from the terminal apparatus to the at least one first target candidate and the error range of the orientation to capture the image of the target, each error range being identified based on the error information when the captured target is assumed to be the at least one first target candidate; and
identify the second target candidate when the error range of the position to capture the image of the target contains at least part of a range of a position to capture the at least one first target candidate.

12. A target identification terminal apparatus comprising:
a first non-transitory storage medium to store position information about a plurality of targets;
a camera that captures an image of the target;
a position information acquisition portion that acquires information about a position to capture the image of the target;
a compass that acquires information about an orientation to capture the image of the target;
a processor connected to a second non-transitory storage medium, the camera, the position information acquisition portion, and the compass; and
a display portion connected to the processor, wherein the second non-transitory storage medium stores instructions that, when executed on the processor, cause the processor to:
identify at least one first target candidate as a candidate for the captured target from the targets based on position information about the targets, information about the position to capture the image of the target, and information about the orientation to capture the image of the target;
identify at least one second target candidate as a candidate for the captured target from the at least one first target candidate based on a distance from the terminal apparatus to the captured target; and
display information about the second identified target candidate on the display portion.

13. The target identification terminal according to claim 12, wherein the second non-transitory storage medium further retains error information indicative of error in the position acquired by the position information acquisition portion, error in the orientation acquired by the compass, and error in the distance from the terminal apparatus to the captured target; wherein the second non-transitory storage medium stores instructions that, when executed on the processor, further cause the processor to: identify an error range of the position to capture the image of the target and an error range of the orientation to capture the image of the target based on the error information and identifies the at least one first target candidate equivalent to the target positioned in a union of error ranges of the orientation to capture the image of the target with reference to ail points in the error range of the position to capture the image of the target; identify a range of a position to capture the at least one first candidate based on an error range of the distance from the terminal apparatus to the at least one first target candidate and the error range of the orientation to capture the image of the target, each error range being identified based on the error information when the target captured by the camera is assumed to be the at least one first target candidate; and identify the first target candidate as the second target candidate when the error range of the position to capture the image of the target contains at least part of a range of a position to capture the first target candidate.

14. The target identification system according to claim 1, wherein the compass is a three-dimensional digital compass.

15. The target identification system according to claim 1, wherein the position information acquisition portion is a GPS unit that acquires the information about the position to capture the image of the target from a GSP satellite.

16. The target identification terminal according to claim 1, wherein the compass is a three-dimensional digital compass, and
wherein the position information acquisition portion is a GPS unit that acquires the information about the position to capture the image of the target from a GPS satellite.

17. The target identification terminal according to claim 12, wherein the compass is a three-dimensional digital compass.

18. The target identification system according to claim 12, wherein the position information acquisition portion is a GPS unit that acquires the information about the position to capture the image of the target from a GPS satellite.

19. The target identification terminal according to claim 12, wherein the compass is a three-dimensional digital compass, and
wherein the position information acquisition portion is a GPS unit that acquires the information about the position to capture the image of the target from a GPS satellite.

* * * * *